United States Patent
Shellhammer et al.

(10) Patent No.: US 12,081,469 B2
(45) Date of Patent: Sep. 3, 2024

(54) MULTI-GENERATION COMMUNICATION IN A WIRELESS LOCAL AREA NETWORK (WLAN)

(71) Applicant: QUALCOMM Incorporated, San Diego, CA (US)

(72) Inventors: Stephen Jay Shellhammer, Ramona, CA (US); Bin Tian, San Diego, CA (US); Sameer Vermani, San Diego, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/209,132

(22) Filed: Mar. 22, 2021

(65) Prior Publication Data

US 2021/0297209 A1  Sep. 23, 2021

Related U.S. Application Data

(60) Provisional application No. 62/993,609, filed on Mar. 23, 2020.

(51) Int. Cl.
*H04W 4/00* (2018.01)
*H04L 5/00* (2006.01)
(Continued)

(52) U.S. Cl.
CPC ........... *H04L 5/0044* (2013.01); *H04W 72/04* (2013.01); *H04W 84/12* (2013.01)

(58) Field of Classification Search
CPC ... H04L 5/0044; H04L 5/0053; H04L 5/0094; H04L 27/2603; H04W 72/04; H04W 84/12; H04W 72/042
See application file for complete search history.

(56) References Cited

U.S. PATENT DOCUMENTS

| 11,515,982 B2 | 11/2022 | Tian et al. |
| 2016/0057657 A1 | 2/2016 | Seok |

(Continued)

FOREIGN PATENT DOCUMENTS

| WO | 2016170505 | 10/2016 |
| WO | 2018152224 | 8/2018 |

(Continued)

OTHER PUBLICATIONS

"802 11 Working Group of the LAN/MAN Standards Committee of the IEEE Computer Society: IEEE Draft; Draft P802.11AX D5", IEEE-SA, Piscataway, NJ USA, vol. 802.11ax drafts, No. D5.1, Nov. 6, 2019, 770 pages.
"PCT Application No. PCT/US2021/019023 International Search Report and Written Opinion", Jun. 21, 2021, 10 pages.
"PCT Application No. PCT/US2021/023581 International Search Report and Written Opinion", Jun. 25, 2021, 12 pages.

(Continued)

*Primary Examiner* — Atique Ahmed
(74) *Attorney, Agent, or Firm* — Holland & Hart LLP

(57) ABSTRACT

This disclosure provides methods, devices and systems for wireless communication, and particularly, methods, devices and systems for generating or receiving a wireless packet that includes a first preamble based on a first generation of a wireless communication protocol and a second preamble based on a second generation of the wireless communication protocol. The wireless packet may include the first preamble in a first subchannel of a wireless channel and the second preamble in a second subchannel of the wireless channel. Thus, the wireless packet may concurrently include communication to or from different types of wireless stations that support the different generations of a wireless communication protocol.

30 Claims, 19 Drawing Sheets

(51) Int. Cl.
 *H04W 72/04* (2023.01)
 *H04W 84/12* (2009.01)

(56) References Cited

U.S. PATENT DOCUMENTS

| | | | | |
|---|---|---|---|---|
| 2016/0087766 | A1* | 3/2016 | Sun | H04L 5/0007 370/329 |
| 2016/0100408 | A1* | 4/2016 | Hedayat | H04L 5/0037 370/329 |
| 2016/0119811 | A1 | 4/2016 | Merlin et al. | |
| 2017/0064711 | A1* | 3/2017 | Choi | H04W 74/04 |
| 2018/0063821 | A1* | 3/2018 | Huang | H04W 74/004 |
| 2018/0367280 | A1* | 12/2018 | Sun | H04W 72/04 |
| 2019/0082390 | A1* | 3/2019 | Azizi | H04L 5/0007 |
| 2019/0097850 | A1 | 3/2019 | Kenney et al. | |
| 2019/0132872 | A1* | 5/2019 | Ko | H04W 84/12 |
| 2019/0190757 | A1* | 6/2019 | Huang | H04W 72/20 |
| 2019/0280919 | A1* | 9/2019 | Sadeghi | H04W 72/04 |
| 2019/0288892 | A1* | 9/2019 | Son | H04L 27/2602 |
| 2019/0289495 | A1* | 9/2019 | Chu | H04L 1/1835 |
| 2019/0289612 | A1 | 9/2019 | Chen et al. | |
| 2020/0037354 | A1* | 1/2020 | Li | H04W 74/0808 |
| 2020/0136884 | A1* | 4/2020 | Park | H04L 27/2602 |
| 2020/0329519 | A1 | 10/2020 | Cao et al. | |
| 2021/0028897 | A1* | 1/2021 | Park | H04L 5/0094 |
| 2021/0242998 | A1* | 8/2021 | Park | H04L 5/0092 |
| 2021/0273757 | A1 | 9/2021 | Shellhammer et al. | |

FOREIGN PATENT DOCUMENTS

| | | |
|---|---|---|
| WO | 2019240792 | 12/2019 |
| WO | 2019240955 | 12/2019 |
| WO | 2021030234 | 2/2021 |
| WO | 2021173484 | 9/2021 |
| WO | 2021195021 | 9/2021 |

OTHER PUBLICATIONS

"PCT Application No. PCT/US2021/032439 International Search Report and Written Opinion", Aug. 5, 2021, 17 pages.

Cailian, et al., "IEEE 802.11be Wi-Fi7: New Challenges and Opportunities", IEEE Communications Surveys and Tutorials, IEEE, USA, vol. 22, No. 4, Jul. 29, 2020, pp. 2136-2166.

Cao, et al., "Aggregated PPDU for Large BW", IEEE Draft; 11-20-0693-00-00BE-Aggregated-PPDU-for-Large-BW, IEEE-SA Mentor, Piscataway, NJ USA, vol. 802 .11 EHT; 802.11be, May 2, 2020, 7 pages.

Chen, et al., "Design of Forward Compatible OFDMA", Dec. 28, 2019, 10 pages.

Choi, "View on EHT Objectives and Technologies", IEEE Draft 802.11-18/1171R0, IEEE-SA Mentor, Piscataway, NJ USA,, Jul. 8, 2018, 13 pages.

Evgeny, et al., "Current Status and Directions of IEEE 802.11be, the Future Wi-Fi 7", IEEE Access, IEEE, USA, vol. 8, May 7, 2020, pp. 88664-88688.

Liu, et al., "Efficient EHT Preamble Design", IEEE Draft; 11-20-0439-00-00BE-Efficient-EHT-Preamble-Design, IEEE-SA Mentor, Piscataway, NJ USA, vol. 802.11 EHT, 802.11be, 13, Nov. 18, 2019, 10 pages.

Noh, "20 MHz transmission in NGV", IEEE Draft; 11-19-1154-00-00BD-20-MHz-Transmission-inNGV, IEEE-SA Mentor, Piscataway, NJ USA, vol. 802.11 NGV;802.11bd, Jul. 14, 2019, 15 pages.

Park, et al., "Consideration on 320MHz Bandwidth and 16 Spatial Streams", 11-19-0778-00-00BE-Consideration-on-320MHz-Bandwidth-and-16-Spatial-Streams, IEEE-SA Mentor, Piscataway, NJ USA, vol. 802.11 EHT; 802.11be, May 13, 2019, 27 pages.

Park, et al., "Phase Rotation Proposal", IEEE Draft; 11-20-0406-00-00BE-Phase-Rotation-Proposal IEEE-SA Mentor, Piscataway, NJ USA, vol. 802.11 EHT; 802.11be, Mar. 16, 2020, 11 pages.

* cited by examiner

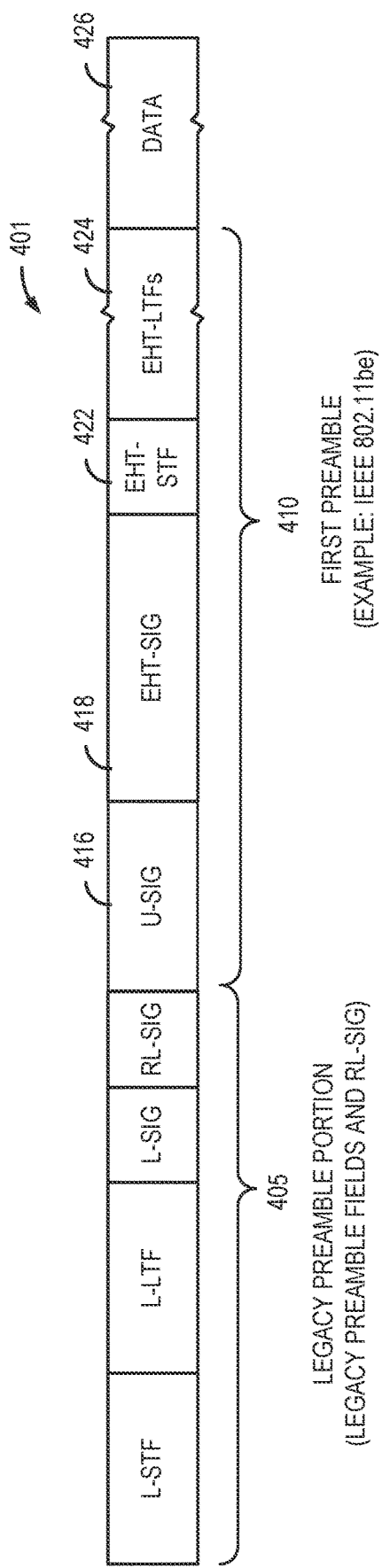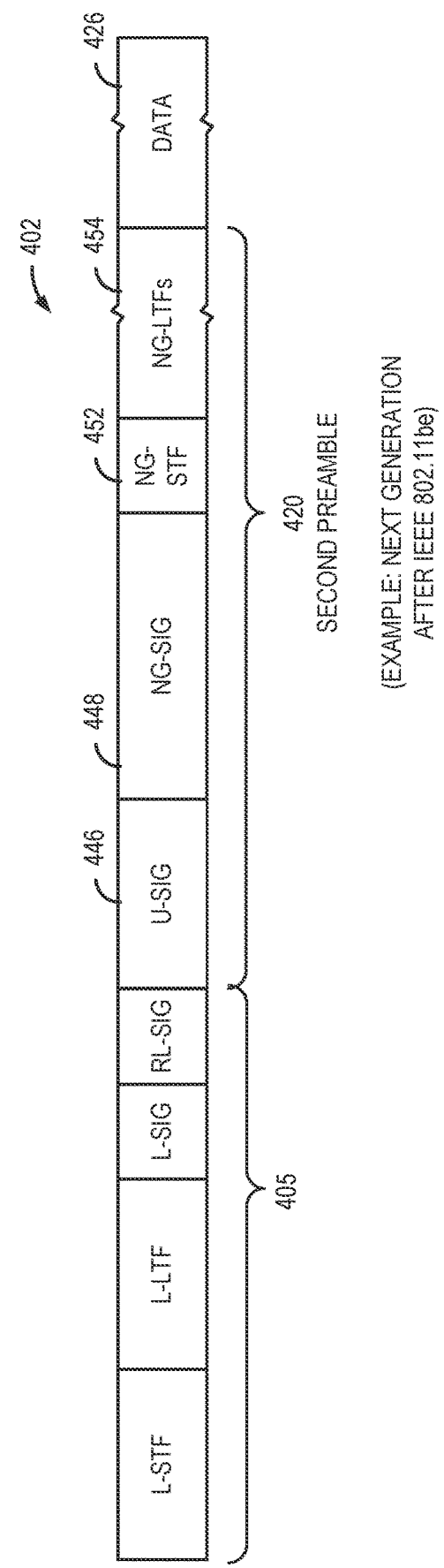
Figure 4A
Figure 4B

MULTI-GENERATION COMMUNICATION IN A WIRELESS LOCAL AREA NETWORK (WLAN)

CROSS-REFERENCE TO RELATED APPLICATIONS

This Patent Application claims priority to U.S. Provisional Patent Application No. 62/993,609, filed Mar. 23, 2020, entitled "MULTI-GENERATION COMMUNICATION IN A WIRELESS LOCAL AREA NETWORK (WLAN)," and assigned to the assignee hereof. The disclosure of the prior Application is considered part of and is incorporated by reference in this Patent Application.

TECHNICAL FIELD

This disclosure relates generally to wireless communication, and more specifically, to multi-generation communication in a wireless local area network (WLAN).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

The IEEE 802.11 family of standards define communication protocols collectively referred to as a WLAN communication protocol. Some amendments to the IEEE 802.11 specification may be referred to as a new generation of the WLAN communication protocol (sometimes also referred to as a new wireless communication protocol). For example, the IEEE 802.11ax and 802.11be amendments to the IEEE 802.11 specification may be considered different generations of the broader IEEE 802.11 WLAN communication protocol. New generations of the WLAN communication protocol are continually created in an ongoing cycle of development. Each generation of the WLAN communication protocol may enable greater bandwidth or enhanced features compared to previous generations.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. The method may include obtaining first data for a first wireless station. The method may include obtaining second data for a second wireless station. The method may include transmitting a wireless packet that includes a first generation-specific preamble formatted according to a first generation of a wireless communication protocol via a first subchannel of a wireless channel and a second generation-specific preamble formatted according to a second generation of the wireless communication protocol via a second subchannel of the wireless channel. The wireless packet may include the first data and the second data populated in respective portions (such as RUs) in one or more data fields after the first and second generation-specific preambles.

Another innovative aspect of the subject matter described in this disclosure can be implemented in a method for wireless communication. The method may include receiving at least a portion of a wireless packet that includes a first generation-specific preamble formatted according to a first generation of a wireless communication protocol via a first subchannel of a wireless channel. The wireless packet may include a second generation-specific preamble formatted according to a second generation of the wireless communication protocol in a second subchannel of the wireless channel. The method may include processing the first generation-specific preamble in accordance with the first generation.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 4A shows an example PPDU with a first preamble based on a first wireless communication protocol.

FIG. 4B shows an example PPDU with a second preamble based on a second wireless communication protocol.

Like reference numbers and designations in the various drawings indicate like elements.

DETAILED DESCRIPTION

Figure 1:
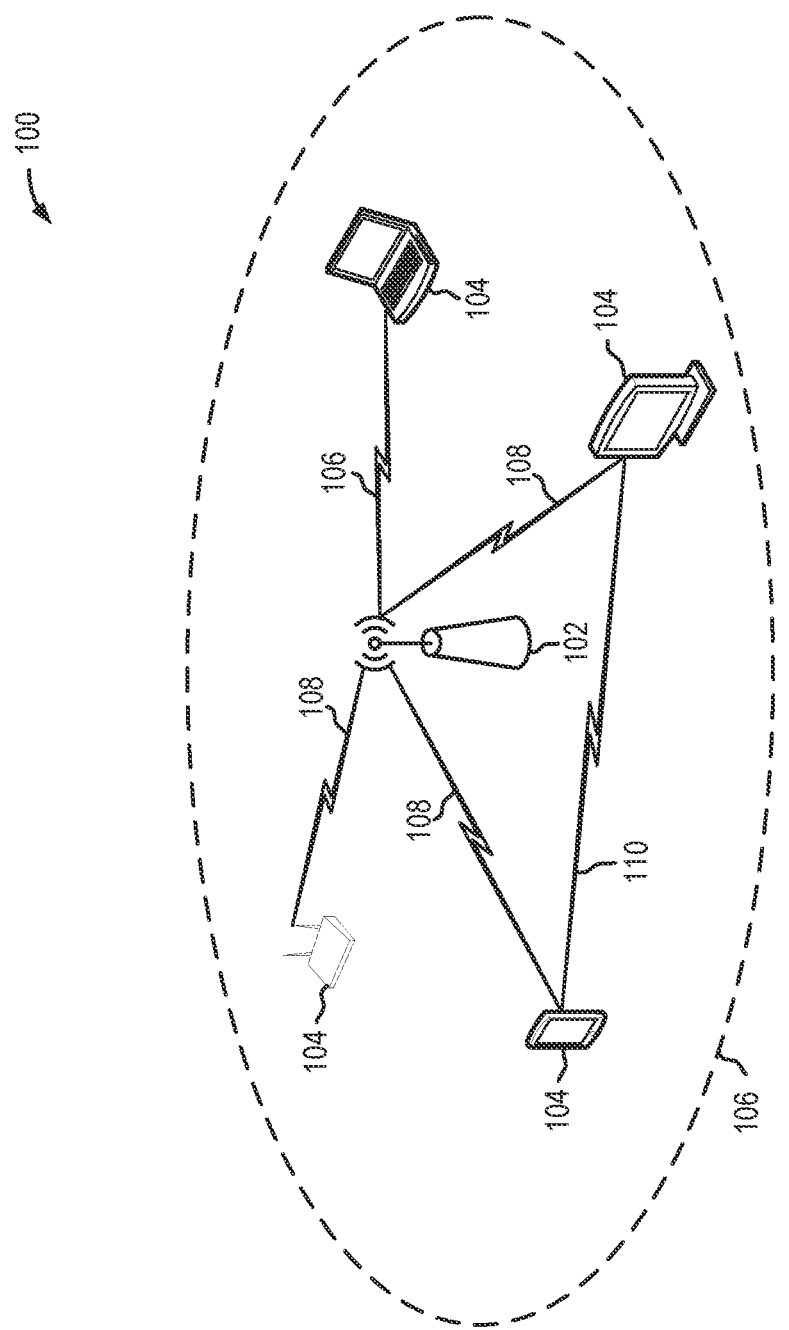
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE). 3G. 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to formats, structures, and techniques for combining data communications formatted according to different generations of the IEEE 802.11 specification in the same wireless packet. A generation of the IEEE 802.11 specification may refer to an amendment that modifies the physical layer (PHY) protocols or defines additional wireless channel bandwidth options associated with WLAN communication. The IEEE 802.11ax amendment, the IEEE 802.11be amendment, and a future amendment may be examples of generations of the IEEE 802.11 specification. In some implementations, the generations may be numbered (such as 4G. 5G, and 6G, among other examples). In some aspects, a wireless packet may be formatted as a single PHY protocol data unit (PPDU) that includes communication according to multiple generations of the IEEE 802.11 specification. Some implementations more specifically relate to the preparation and transmission of a wireless packet that includes both signaling and data according to the different generations. Signaling refers to control fields or information that can be used to indicate subchannel puncturing, structure of a data field, or resource unit (RU) allocations, among other examples. In some implementations, the wireless packet may concurrently include preambles for the different generations in different respective subchannels of the wireless channel. In some implementations, the PPDU may include a single data field spans the entire channel bandwidth following the generation-specific subchannel preambles having the different generations. In some other implementations, the wireless packet may be formatted as a compound PPDU that is formed from PPDUs of different wireless communication protocols, each including a preamble and a data field based on a respective generation in a same respective subchannel, that are then transmitted concurrently as the compound PPDU. The wireless packet may be referred to as a multi-generation PPDU because it supports multiple generations of the IEEE 802.11 specification.

In some aspects, while the multi-generation PPDU may span the entire channel bandwidth of the wireless channel, the multi-generation PPDU may include different generation-specific preambles in different subchannels. Each generation-specific preamble may be structured according to a different wireless communication protocol representing a different generation of the IEEE 802.11 specification. A generation-specific preamble may include RU allocations (or "assignments") for one or more data fields that follow the generation-specific preambles. In some implementations, each generation-specific preamble may signal RU allocations within a single data field that spans the entire channel bandwidth. In some implementations, a generation-specific preamble may restrict RU allocations within a subchannel portion of single data field. Thus, the single data field that follows the generation-specific preambles may be segmented based on the subchannels and the generation-specific preambles may include only the RU assignments within its same subchannel. In some implementations, in which the multi-generation PPDU is formatted as a compound PPDU, each subchannel may include a separate generation-specific preamble that signals RU allocations within a generation-specific data field in that subchannel.

Aspects of the multi-generation PPDUs described herein may enable selective-bandwidth preamble processing. For example, a WLAN device may be configured to decode a generation-specific preamble in a particular subchannel without decoding the generation-specific preambles in other subchannels. In some implementations, the multi-generation PPDU may include a generation-specific preamble and a generation-specific data field in the same subchannel such that a WLAN device supporting the specific generation, but perhaps not others, may decode only the portion of the multi-generation PPDU within that subchannel. Furthermore, when the multi-generation PPDU is formatted as a compound PPDU, the WLAN device may treat the generation-specific preamble and generation-specific data field within a subchannel as a separate PPDU and may disregard the other portions of the multi-generation PPDU in the other subchannels.

In some implementations, the generation-specific preambles are aligned for preamble orthogonality. For example, the lengths of a first preamble and a second preamble, although based on different wireless communication protocols, may be the same so that when they are communicated in the different subchannels, they end at the same time. In some implementations, a WLAN device may add padding to a generation-specific preamble or a data field to support preamble orthogonality and data field orthogonality. Furthermore, the first preamble and the second preamble may be structured so that they are transmitted in concurrent orthogonal frequency division multiplexing (OFDM) symbols that have the same format (such as symbol duration, subcarrier spacing, and duration guard interval), albeit via different respective subcarriers (or "tones") of the multi-generation PPDU.

Particular implementations of the subject matter described in this disclosure can be implemented to realize one or more of the following potential advantages. As described initially above, the multi-generation PPDUs presented herein can support simultaneous communication to or from stations (STAs) that implement different generations of the WLAN communication protocols. As the WLAN communication protocols evolve to expand the channel bandwidth or to add other features, the multi-generation PPDUs may continue to enable communications formatted according to previous generations while supporting communications formatted using the new generations concurrently. Additionally, because the multi-generation PPDU may include multiple generations of preambles. RUs can be allocated with greater flexibility.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad. 802.11ay. 802.11ax. 802.11az. 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHZ, 5 GHZ, 6 GHZ or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az. 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ band, the 5 GHz band, the 60 GHz band, the 3.6 GHz band, and the 900 MHZ band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHZ bands, each of which is divided into multiple 20 MHZ channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHZ, 160 or 320 MHz by bonding together multiple 20 MHZ channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
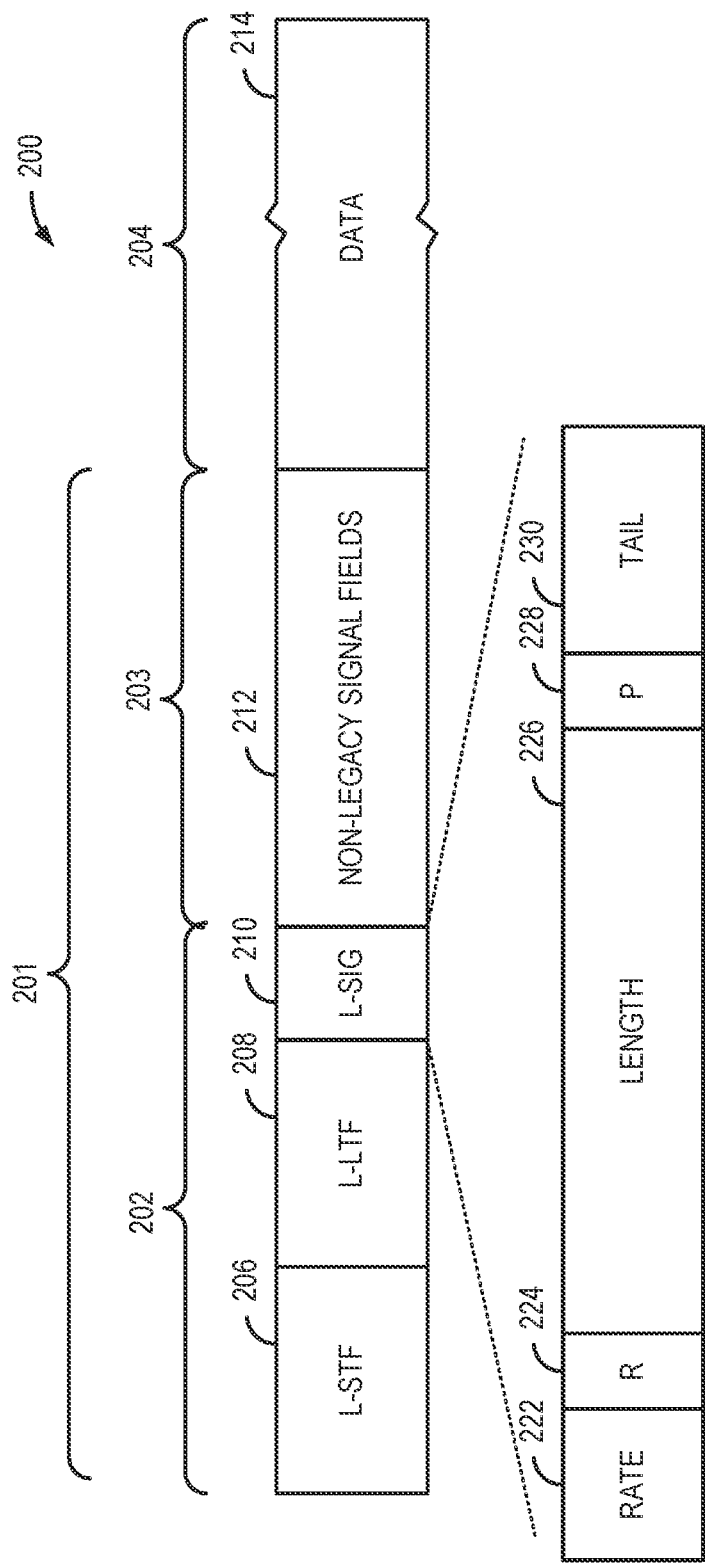
FIG. 2 shows an example physical layer convergence protocol (PLCP) protocol data unit (PPDU) usable for communications between an access point (AP) and a number of stations (STAs).

FIG. 2 shows an example PPDU) 200 usable for wireless communication between an AP and a number of STAs. As shown, the PPDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PPDU and to use the determined duration to avoid transmitting on top of the PPDU. For example, the L-STF 206, the L-LTF 208 and the L-SIG 210 may be modulated according to a binary phase shift keying (BPSK) modulation scheme. FIG. 2 shows an example L-SIG 210 in the PPDU 200. L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

The preamble 201 may also include a second portion 203 including one or more non-legacy signal fields 212, for example, conforming to an IEEE wireless communication protocol such as the IEEE 802.11ac, 802.11ax, 802.11be or later wireless communication protocol standards. In some implementations, the second portion 203 of the preamble 201 may include a repeat of the L-SIG (RL-SIG, not shown) before the non-legacy signal fields 212. To accommodate later generations of the IEEE wireless communication protocols, some of the L-SIG 210 fields (such as the data rate field 222 and length field 226) have been redefined or overloaded with new definitions. For example, the data rate field 222 and the length field 226 may be populated with values to identify a type of non-legacy signal fields 212 that will follow. However, such a solution may not be scalable, and the redefined or overloaded L-SIG fields may become saturated as more wireless communication protocols are developed. As described further in this disclosure, the non-legacy signal fields 212 may include a universal signal field (U-SIG, not shown) that is constructed to indicate a type of PPDU, an indication of the generation (such as a version indicator) of the wireless communication protocol associated with the PPDU, a bandwidth setting, puncturing, or any combination thereof.

Following the non-legacy signal fields 212, the PPDU 200 may include a payload 204. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 3:
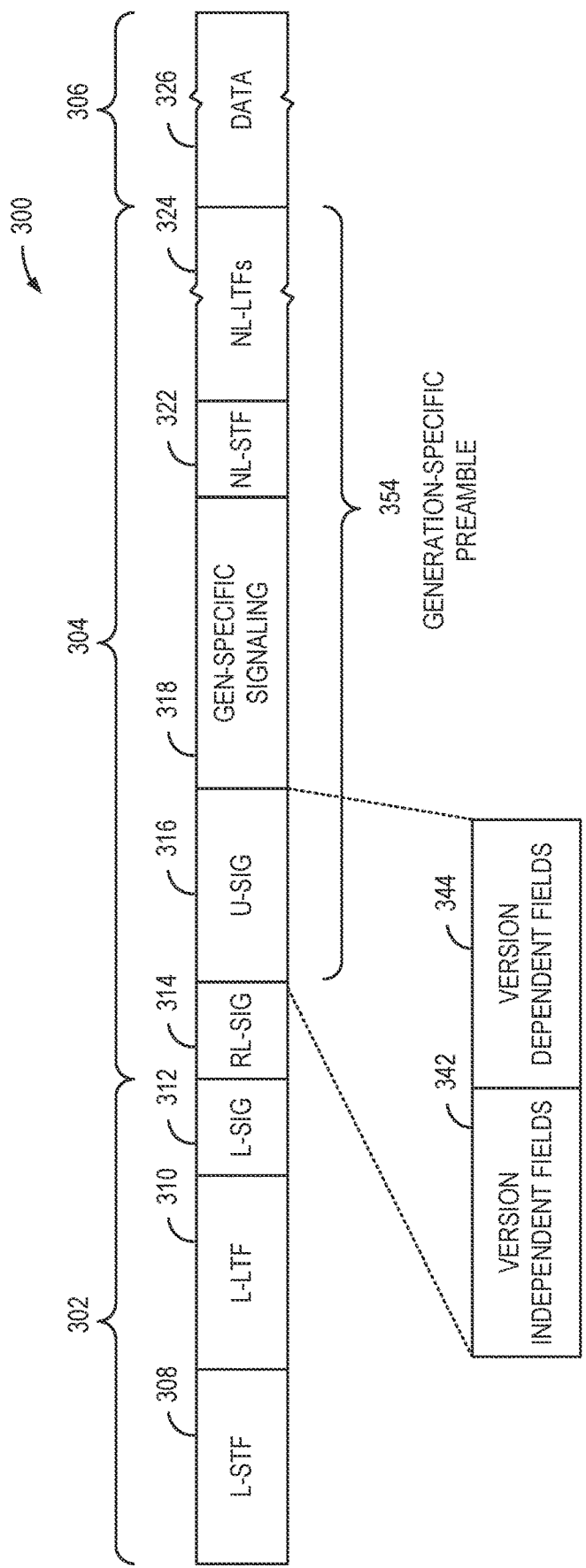
FIG. 3 shows an example PPDU that includes a universal signal field (U-SIG).

FIG. 3 shows an example PPDU that includes a U-SIG. For example, the PPDU 300 can be configured as a PPDU. The IEEE is expected to implement U-SIG 316 as part of the preamble for the IEEE 802.11be amendment to the IEEE 802.11 standard as well as for the preambles of future generations (for example, for subsequent amendments to the IEEE 802.11 standard). The U-SIG 316 may include version-independent fields and version-dependent fields. The version-independent fields may be commonly specified for multiple generations, for example, starting with 802.11be and going forward. Among other things, the U-SIG 316 may indicate a format of the PPDU, an indication of the generation (for example, the Extreme High Throughput (EHT) protocol defined in 802.11be), a subchannel bandwidth, puncturing, or any combination thereof. The version-dependent fields may depend on the generation of the wireless communication protocol (for example, associated with a particular amendment to the IEEE 802.11 standard) used to format and otherwise generate the PPDU. The U-SIG 316 may be followed by generation-specific signaling 318. Together, the U-SIG 316 and generation-specific signaling 318 may be referred to collectively as a generation-specific preamble 354. The format of the generation-specific preamble 354 may differ based on the generation of the wireless communication protocol. For example, the U-SIG 316 may precede generation-specific signaling 318 that is formatted as an EHT portion of the preamble in accordance with the IEEE 802.11be amendment to the IEEE 802.11 wireless communication protocol standard, or may be formatted as a preamble conforming to any later (post-EHT) generation of a new wireless communication protocol conforming to a future IEEE 802.11 wireless communication protocol standard or other standard.

The PPDU 300 includes a PHY preamble including a first portion 302 and a second portion 304. The PPDU 300 may further include a PHY payload 306 after the preamble, for example, in the form of a PSDU including DATA field 326. The first portion 302 includes an L-STF 308, an L-LTF 310, and an L-SIG 312. The second portion 304 of the preamble includes a repeated legacy signal field (RL-SIG) 314. Following the RL-SIG 314, the second portion 304 of the preamble includes the U-SIG 316. Depending on the format of the PPDU, the PPDU 300 may include a generation-specific signal field, such as the generation-specific signaling field 318. The second portion 304 further includes an additional non-legacy short training field 322 (referred to herein as "NL-STF" although it may be structured as, and carry generation-dependent information for, other wireless communication protocol versions) and a number of additional non-legacy long training fields 324 (referred to herein as "NL-LTFs" although they may be structured as, and carry generation-dependent information for, other wireless communication protocol versions).

The U-SIG 316 may include version-independent fields 342 and version-dependent fields 344. Examples of the version-independent fields 342 may include a version identifier, an indication of whether the PPDU 300 is an uplink (UL) or a downlink (DL) PPDU, a BSS color, and a transmission opportunity (TxOP) duration, among other examples. The version identifier in the version-independent fields 342 may indicate a version (and associated format) for the version-dependent fields 344. In some implementations, the version-dependent fields 344 may indicate a PPDU format (such as in a format information field). The PPDU format may determine which other indicators are included in the version-dependent fields 344 as well as the format or contents of the rest of U-SIG 316 and the generation-specific signaling 318. For example, depending on the value of the PPDU format field in the version-dependent fields 344, the PPDU 300 may include different formats 372, 374, 376, or 378 for the generation-specific signaling 318. In some implementations, the generation-specific signaling 318 may include RU allocations, among other examples. The U-SIG 316 may be a two-symbol length followed by a variable length generation-specific signaling 318. In some implementations, the generation-specific signaling 318 has an adjustable MCS indicated by the U-SIG 316. In some implementations. U-SIG 316 may include PPDU bandwidth (BW) and punctured channel information. The PPDU BW and punctured channel information may be referred to collectively as frequency occupation indications. The frequency occupation indications may permit WLAN devices on the wireless channel to determine the utilization of the various parts of the wireless channel. For example, the frequency occupation information may be used to indicate puncturing of some subchannels.

FIG. 4A shows an example PPDU with a first preamble based on a first wireless communication protocol. For example, the PPDU 401 can be an example of a traditional PPDU according to the IEEE 802.11be amendment to the IEEE 802.11 specification. The PPDU 401 includes the legacy preamble fields (L-STF. L-LTF, and L-SIG) and RL-SIG field as described with reference to FIG. 3. The legacy preamble fields, and RL-SIG may be referred to as a legacy preamble portion 405. Following the legacy preamble portion 405, the PPDU 401 includes a first preamble 410. The first preamble 410 may include a U-SIG 416 similar to the U-SIG 316 described with reference to FIG. 3. In some implementations, the U-SIG 416 may alter how the rest of the first preamble 410 is structured. For example, as described with reference to FIG. 3, the U-SIG may be followed by generation-specific signaling. In FIG. 4A, the generation-specific signaling is an EHT signal field (EHT-SIG) 418 field. For example, the U-SIG 416 may indicate a format of the EHT-SIG 418 in the various component channels, available channel bandwidths, and modulation and coding schemes (MCSs), among other possibilities. The EHT-SIG 418 may be used by an AP to identify and inform multiple STAs that the AP has scheduled UL or DL resources. The EHT-SIG 418 may be decoded by each compatible STA served by the AP. The EHT-SIG 418 may carry STA-specific scheduling information such as, for example, per-user MCS values and per-user RU allocation information. EHT-SIG 418 may generally be used by a receiving device to interpret bits in the DATA field 426. In some implementations, the EHT-SIG 418 includes a common field and at least one STA-specific ("user-specific") field. The common field can indicate RU distributions to multiple STAs, indicate the RU assignments in the frequency domain, indicate which RUs are allocated for MU-MIMO transmissions and which RUs correspond to MU-OFDMA transmissions, and the number of users in allocations, among other possibilities. The user-specific fields are assigned to particular STAs and may be used to schedule specific RUs and to indicate the scheduling to other WLAN devices. The common field may have a varying length. Each user-specific field may include multiple user block fields (which may be followed by padding). Each user block field may include, for example, two user fields that contain information for two respective STAs to decode their respective RU payloads. The first preamble 410 also may include an EHT short training field (EHT-STF) 422 and EHT long training field (EHT-LTF) 424.

FIG. 4B shows an example PPDU with a second preamble based on a second wireless communication protocol. By design, the PPDU 402 has a similar structure and size as the PPDU 401 described with reference to FIG. 4A. However, the PPDU 402 may be the format for a next generation of the IEEE 802.11 specification as defined by a new amendment to the specification that may come after IEEE 802.11be. For brevity, the next generation of the specification may be referred to as next generation (NG). The PPDU 402 includes the legacy preamble portion 405 followed by a second preamble 420. The second preamble 420 includes a U-SIG 446 and generation-specific signaling. The generation-specific signaling may be formatted as a next generation signal field (NG-SIG) 448. The format and contents of the NG-SIG 448 may be different from the EHT-SIG 418 described with reference to FIG. 4A. In some implementations, the NG-SIG 448 includes RU allocation information indicating resources within the in the DATA field 426 that have been allocated to one or more STAs. The second preamble 420 also may include next generation short training field (NG-STF) 452 and next generation long training field (NG-LTF) 454.

PPDUs 401 and 402 in FIGS. 4A and 4B, respectively, have been described separately. However, as described in this disclosure, it may be possible to combine or merge them to form a multi-generation PPDU in accordance with implementations of this disclosure. In some implementations, the formats of the PPDUs 401 and 402 may be modified or adapted for use in a multi-generation PPDU. For example, one or both of the EHT-SIG 418 and NG-SIG 448 may be extended with padding symbols so that they are both the same length.

Figure 5:
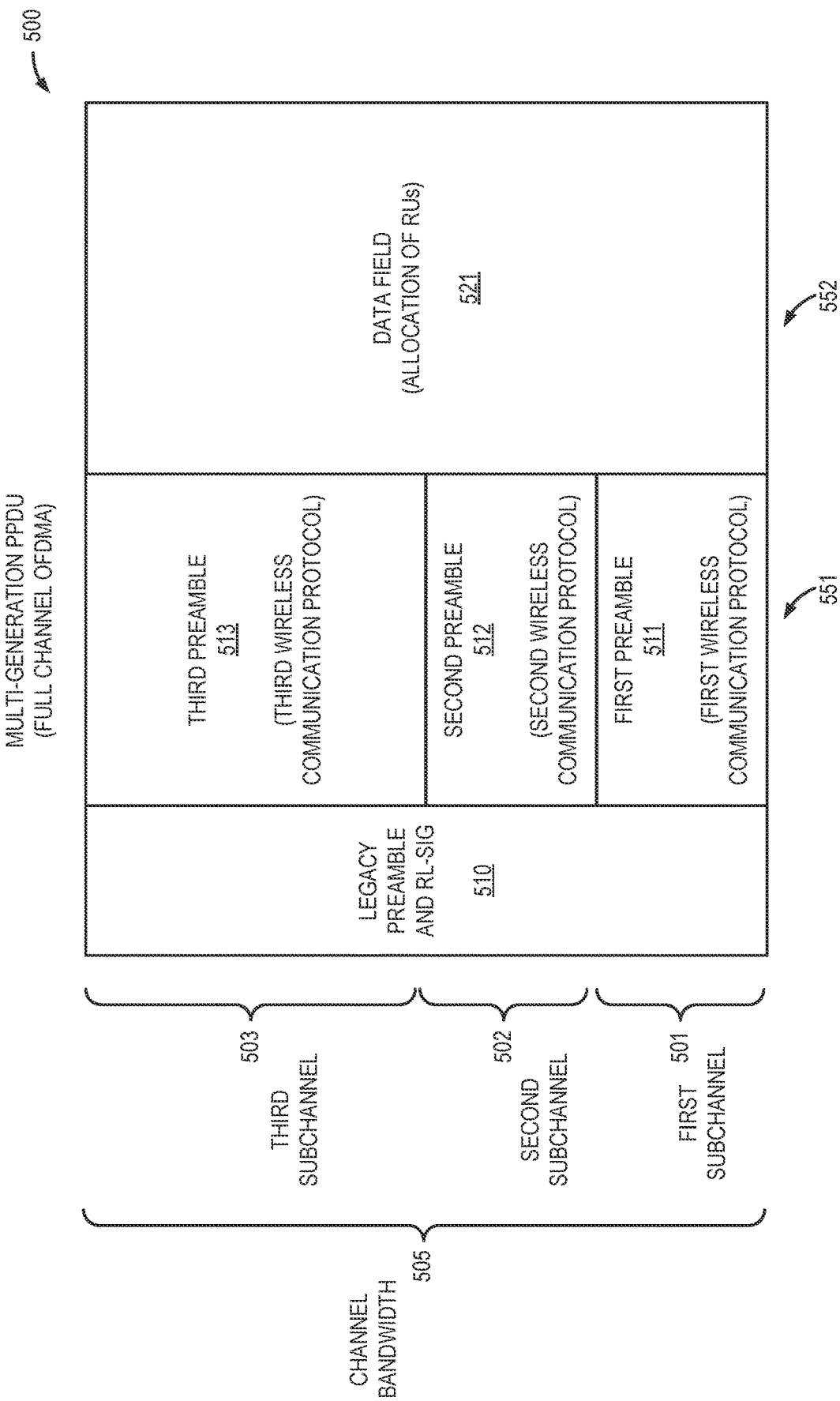
FIG. 5 shows an example wireless packet having preambles based on different wireless communication protocols according to some implementations.

FIG. 5 shows an example wireless packet 500 having preambles based on different wireless communication protocols according to some implementations. The wireless packet 500 may span the channel bandwidth 505 of a wireless channel. In the example of FIG. 5, the wireless channel may include a first subchannel 501, a second subchannel 502, and a third subchannel 503. In various implementations, the wireless channel may have a bandwidth that is greater than or equal to 320 MHZ. In some such implementations, the generation-specific preambles may be signaled in subchannels that have a bandwidth size that is a multiple of 80 MHz bandwidth. For example, the bandwidth of each subchannel may be 80 MHZ, 160 MHZ. 240 MHZ. 320 MHZ. 400 MHZ. 480 MHZ, or greater. The bandwidths of the subchannels may be different. In the example shown in FIG. 5, the first subchannel 501 may have a bandwidth of 160 MHZ, the second subchannel 502 also may have a bandwidth of 160 MHZ, and the third subchannel 503 may have a bandwidth of 320 MHZ. Thus, the total channel bandwidth 505 in this example is 640 MHZ. The wireless packet 500 includes a legacy preamble portion 510 (such as the legacy preamble fields and RL-SIG). The legacy preamble portion 510 may be duplicated through each subchannel within the wireless channel. Following the legacy preamble portion 510, the wireless packet 500 includes generation-specific preambles 551. The generation-specific preambles 551 may be based on different wireless communication protocols and may be signaled in different subchannels. For example, the generation-specific preambles 551 include a first preamble 511 in the first subchannel 501, a second preamble 512 in the second subchannel 502, and a third preamble 513 in the third subchannel 503. Each of the generation-specific preambles 551 may include a U-SIG as well as generation-specific signaling as described with reference to FIGS. 3, 4A, and 4B. For example, the first preamble 511 may be similar to the first preamble 410 described with reference to FIG. 4A and may be formatted according to a first wireless communication protocol defined by IEEE 802.11be. The second preamble 512 may be similar to the second preamble 420 described with reference to FIG. 4B and may be formatted according to a second wireless communication protocol defined by the next generation of the IEEE 802.11 technical standard specification. The third preamble 513 may be yet another generation of IEEE 802.11 or may be another instance of the IEEE 802.11be or next generation format.

Following the generation-specific preambles 551, the wireless packet 500 may include a data field 552. In the example of FIG. 5, the data field 552 is a single data field 521 that spans the full channel bandwidth 505. The generation-specific preambles 551 may include RU assignments to different STAs. The RU assignments may indicate resources within the single data field 521. In some implementations, the size and distribution of the RUs available may be based on the technical standard specification for each generation. For example, the first generation of the technical standard specification may define RU allocation tables that can be used for up to 320 MHz bandwidth (which is only half of the total channel bandwidth 505 in the example of FIG. 5). Thus, the first preamble 511 may include RU allocations that are within the first subchannel 501 and the second subchannel 502. Hypothetically, the next generation of the technical standard specification may support RU allocation for a larger bandwidth, such as the full channel bandwidth 505 of 640 MHZ. The second preamble 512 may include RU allocations from within the first subchannel 501, the 502, and the third subchannel 503. In other words, the subchannel sizes may be relevant for the generation-specific preambles 551 but not for the data field 552, depending on the RU allocation tables and options present in each generation of the technical standard specification. In another example, the RU allocations may be limited or restricted based on the subchannel sizes as described with reference to FIG. 6.

Figure 6:
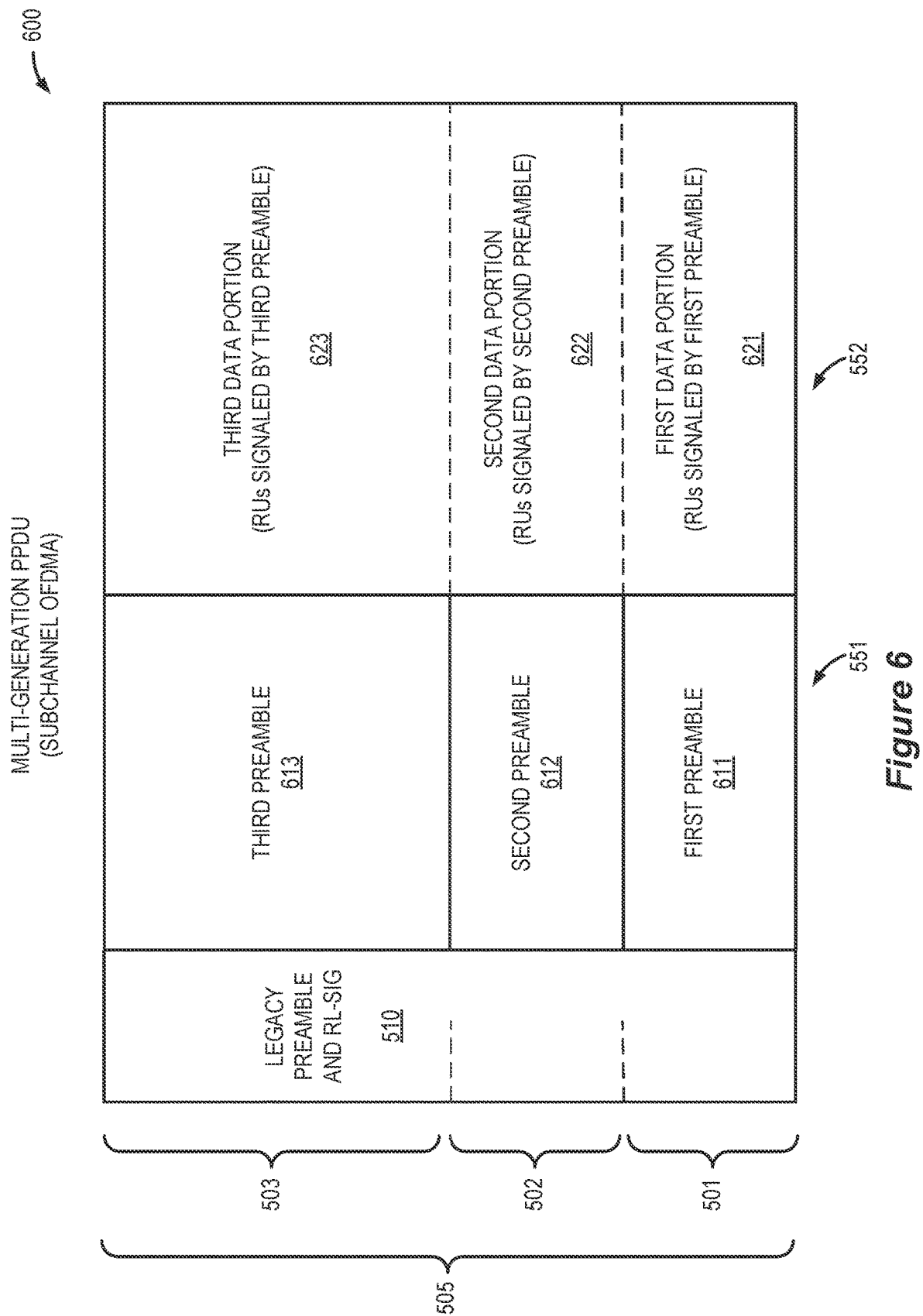
FIG. 6 shows an example wireless packet in which resource unit (RU) allocations signaled by a first preamble are limited to the same subchannel as the first preamble according to some implementations.

FIG. 6 shows an example wireless packet 600 in which RU allocations signaled by a first preamble are limited to the same subchannel as the first preamble according to some implementations. The structure of the wireless packet 600 may be similar to the structure of the wireless packet 500 described with reference to FIG. 5. For example, the wireless packet 600 may include a legacy preamble portion 510, a plurality of generation-specific preambles 551, and a data field 552. A first preamble 611 may occupy a first subchannel 501, a second preamble 612 may occupy a second subchannel 502, and a third preamble 613 may occupy a third subchannel 503. The wireless packet 600 in FIG. 6 differs from the wireless packet 500 in FIG. 5, in that the wireless packet 600 restricts RU allocations in the data field 552 to the subchannel sizes. For example, the first preamble 611 may include RU allocations in the first data portion 621 of the data field 552 based on the first subchannel 501. The RU allocations signaled in the first preamble 611 may refer to allocations within a first subchannel bandwidth for the first data portion 621 of the data field 552. Similarly, the RU allocations indicated in the second preamble 612 may be limited to a second data portion 622 of the data field 552, and the RU allocations indicated in the third preamble 613 may be limited to a third data portion 623 of the data field 552. Although the subchannel RU restrictions are shown for all the generation-specific preambles 551, some implementations may use subchannel RU restrictions for only some of the generation-specific preambles 551. For example, in some implementations, the first preamble 611 may be restricted to RU allocations within the first data portion 621 while the second preamble 612 is not restricted to the second data portion 622.

Figure 7A:
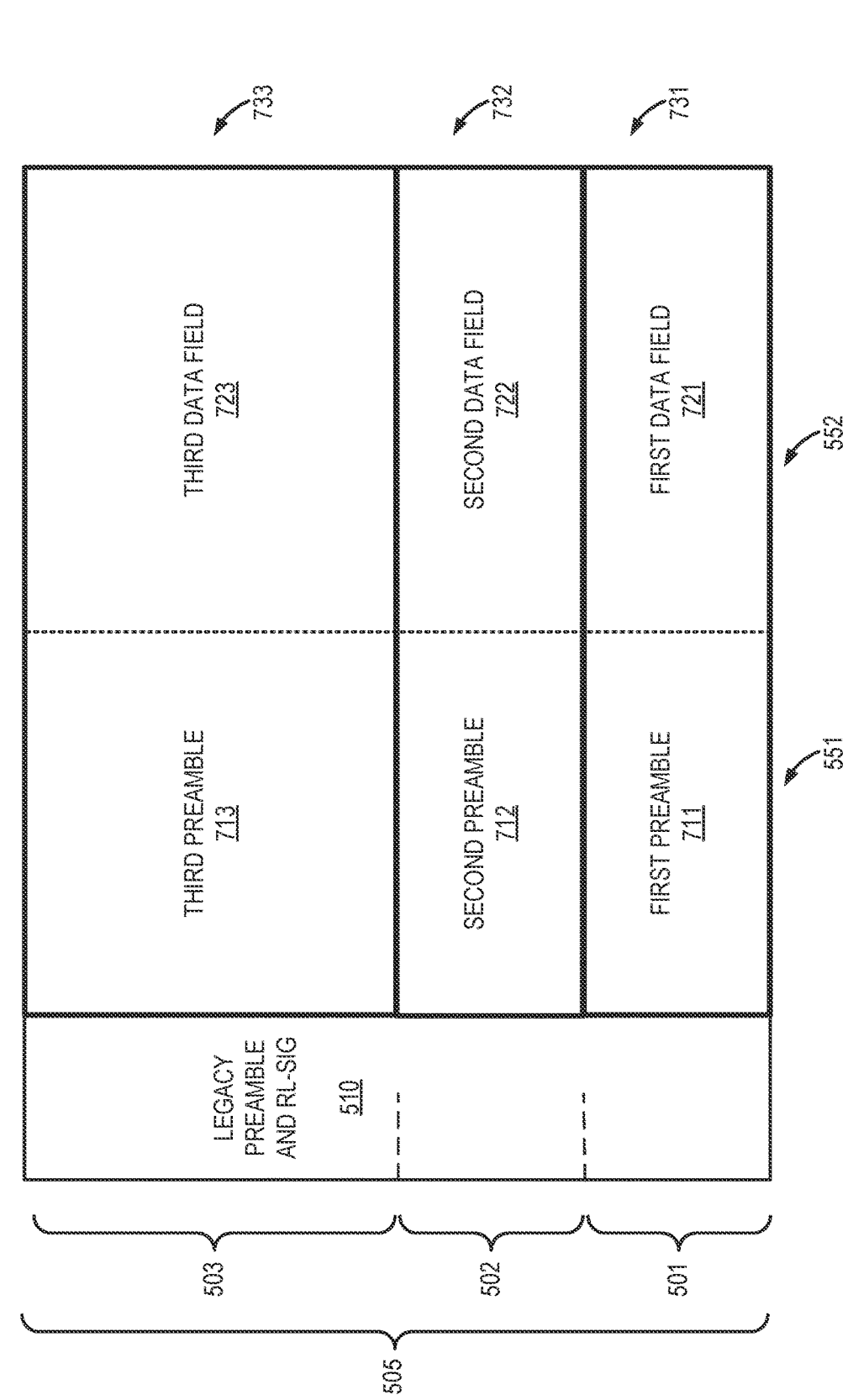
FIG. 7A shows an example wireless packet formatted as a compound PPDU that includes concurrently signaled PPDUs in different subchannels according to some implementations.

FIG. 7A shows an example wireless packet 700 formatted as a compound PPDU that includes concurrently signaled PPDUs in different subchannels according to some implementations. Similar to the corresponding features described with reference to FIGS. 5 and 6, the wireless packet 700 may include a legacy preamble portion 510 followed by generation-specific preambles 551 in different subchannels. The wireless packet 700 differs from the previous examples in that each of the generation-specific preambles 551 are associated with corresponding generation-specific data fields in the data field 552. For example, a first preamble 711 and a first data field 721 may occupy a first subchannel 501. Together, the first preamble 711 and the first data field 721 may be formatted as a first PPDU 731 based on a first wireless communication protocol. For example, the first PPDU 731 may be similar to the PPDU 401 described with reference to FIG. 4A. Similarly, a second preamble 712 and a second data field 722 may occupy a second subchannel 502 and may form a second PPDU 732 based on a second wireless communication protocol. For example, the second PPDU 732 may be similar to the PPDU 402 described with reference to FIG. 4B. A third preamble 713 and a third data field 723 may occupy a third subchannel 503 and may be formatted according to a third wireless communication protocol as defined by a future generation of the technical standard specification. Rather than transmit each of the separate PPDUs 731, 732, and 733, a WLAN device may combine them to form a compound PPDU having the structure described with reference to FIG. 7A. The compound PPDU also may be referred to as a combination PPDU, a Multi-Gen PPDU, a multi-PPDU, an mPPDU, an aggregated PPDU (A-PPDU), or other terms.

When preparing the wireless packet 700 based on a combination of generation-specific PPDUs 731, 732, and 733, a WLAN device may modify the generation-specific PPDUs so that the preambles and data fields line up in time. For example, for preamble orthogonality, it may be desirable for the OFDM symbols of the generation-specific preambles 551 to line up in time. For example, the OFDM symbols may use the same symbol duration, guard interval duration, and subcarrier spacing, among other examples. Furthermore, the quantity of OFDM symbols used for each generation-specific preamble may be consistent. In some implementations, extra OFDM symbols may be added to one or more of the generation-specific preambles 551 such that the generation-specific preambles 551 align in time. For example, if one of the generation-specific preambles 551 is shorter than the others, a transmitting WLAN device may add padding so that the lengths of all the generation-specific preambles 551 are the same. Similarly, the transmitting WLAN device may add padding to one or more of the generation-specific data fields so that the data fields have a same length and can be communicating using the same OFDM symbols for the wireless channel.

Figure 7B:
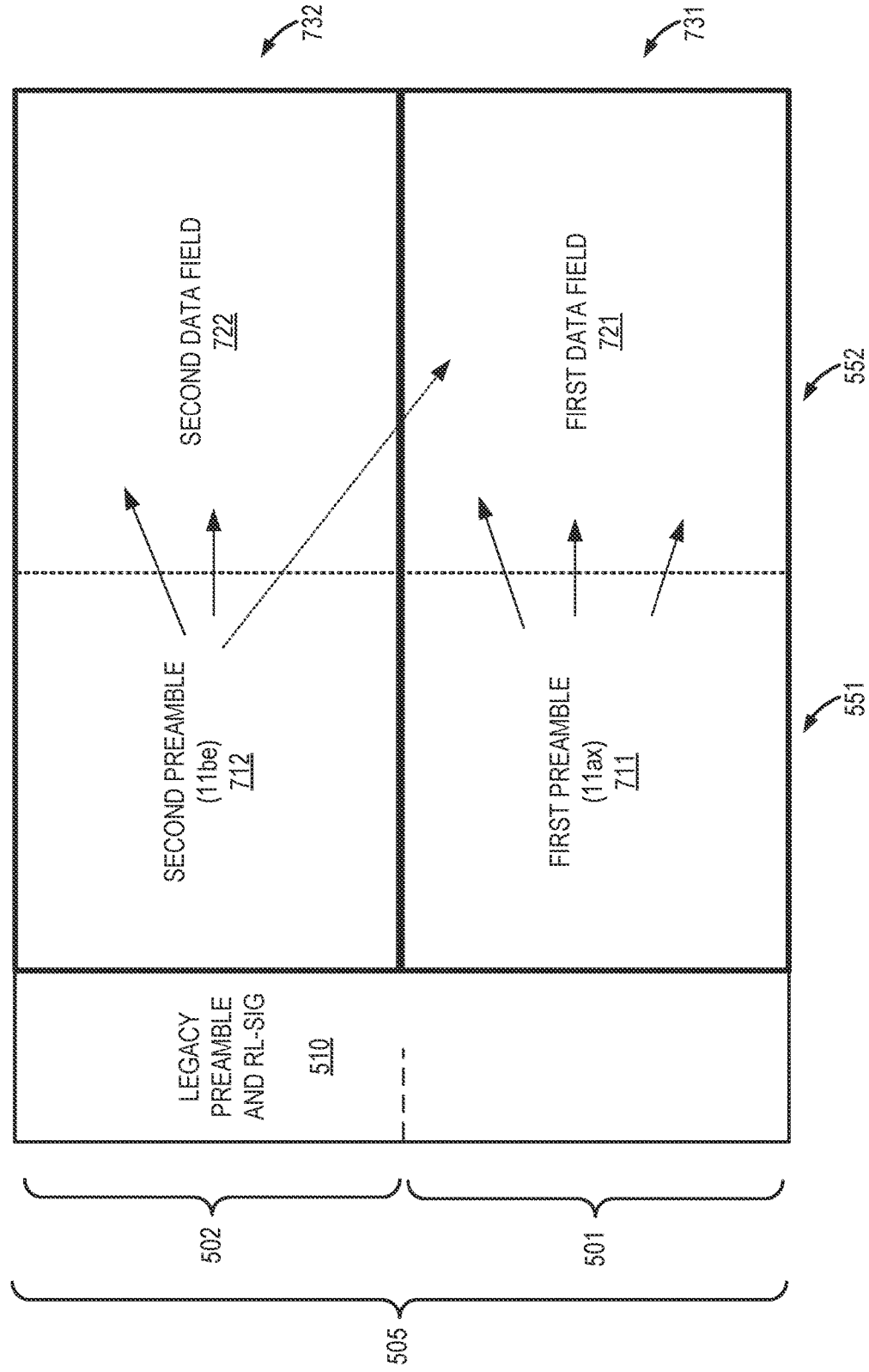
FIG. 7B shows another example wireless packet formatted to concurrently support multiple generations according to some implementations.

FIG. 7B shows another example wireless packet 701 formatted to concurrently support multiple generations according to some implementations. Similar to the corresponding features described with reference to FIG. 7A, the wireless packet 701 may include a legacy preamble portion 510 followed by generation-specific preambles 551 in different subchannels. In FIG. 7B, a first preamble 711 may occupy a first subchannel 501 and may be formatted as an IEEE 802.11ax generation-specific preamble. A second preamble 712 may occupy a second subchannel 502 and may be formatted as an IEEE 802.11 be generation-specific preamble. As an illustrative example, the wireless channel may have a 320 MHz channel bandwidth 505 and each of the first subchannel 501 and the second subchannel 502 have 160 MHz bandwidth. The first preamble 711 may restrict RU allocations to RUs located within a first data field 721 in the first subchannel 501 because IEEE 802.11ax supports 160 MHz bandwidth. For example, RU allocation tables and tone maps for IEEE 802.11ax may be limited to 160 MHZ bandwidth. Meanwhile. IEEE 802.11be may support up to 320 MHZ bandwidth and may define RU allocation tables and signaling to support the higher bandwidth. The second preamble 712 may include signaling for an RU allocation that includes RUs located within the first data field 721 and the second data field 722. A wireless station that implements IEEE 802.11be may decode the second preamble 712 to identify RUs allocated within the first and second subchannels 501 and 502. A wireless station that does not implement IEEE 802.11be but implements IEEE 802.11ax may decode the first preamble 711 to identify RUs allocated within the first subchannel 501. Thus, the wireless packet 701 can concurrently transmit data to wireless stations using either IEEE 802.11 ax and IEEE 802.11be.

The example multi-generation PPDUs 500, 600, 700, and 701 with reference to FIGS. 5, 6, 7A and 7B, respectively, are provided as illustrative examples of combining generation-specific preambles to form a multi-generation PPDU for a wireless channel. The combination of generation-specific preambles enables a wireless channel to support WLAN devices made for different generations of a technical standard specification. In some implementations, a receiving WLAN device may observe a generation-specific preamble within a subchannel. For example, a STA that is parked or monitoring the first subchannel 501 the first preamble (such as the first preamble 511, the first preamble 611, or the first preamble 711 as described with reference to FIGS. 5, 6, 7A and 7B, respectively) while disregarding the generation-specific preambles in the other subchannels.

Figure 8:
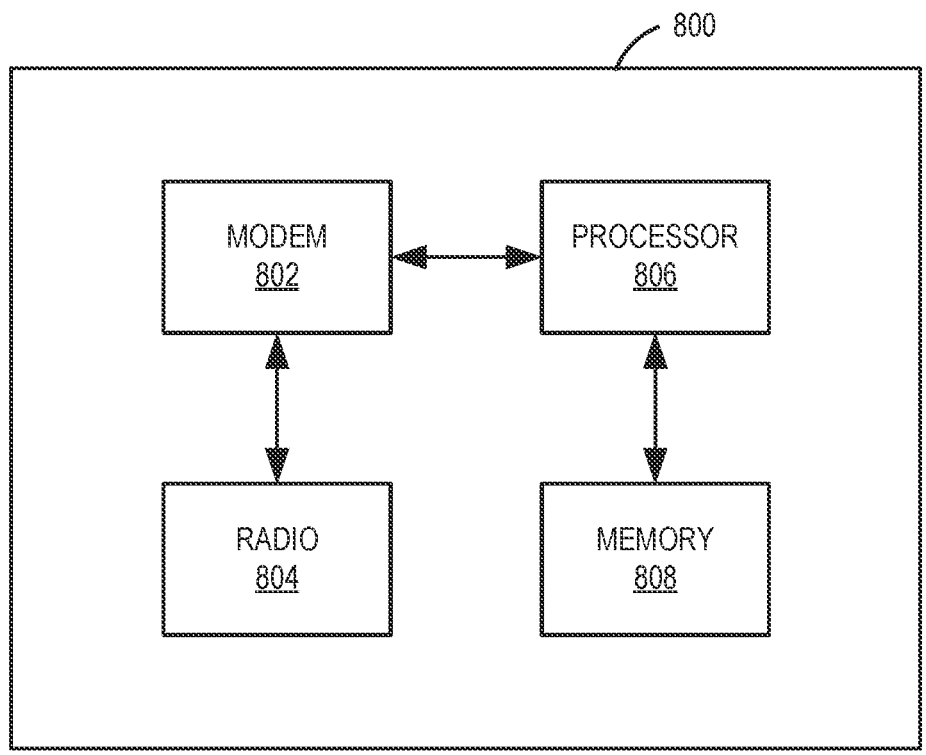
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 described above with reference to FIG. 1. In some implementations, the wireless communication device 800 can be an example of a device for use in an AP such as the AP 102 described above with reference to FIG. 1. The wireless communication device 800 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 806 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrow band) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 806) for processing, evaluation, or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs or frames. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 804 can include tangible storage media such as random-access memory (RAM) or read-only memory (ROM), or combinations thereof. The memory 804 also can store non-transitory processor- or computer-executable software (SW) code containing instructions that, when executed by the processor 806, cause the processor to perform various operations described herein for wireless communication, including the generation, transmission, reception and interpretation of PPDUs, MPDUs, frames or packets. For example, various functions of components disclosed herein, or various blocks or steps of a method, operation, process or algorithm disclosed herein, can be implemented as one or more modules of one or more computer programs.

Figure 9B:
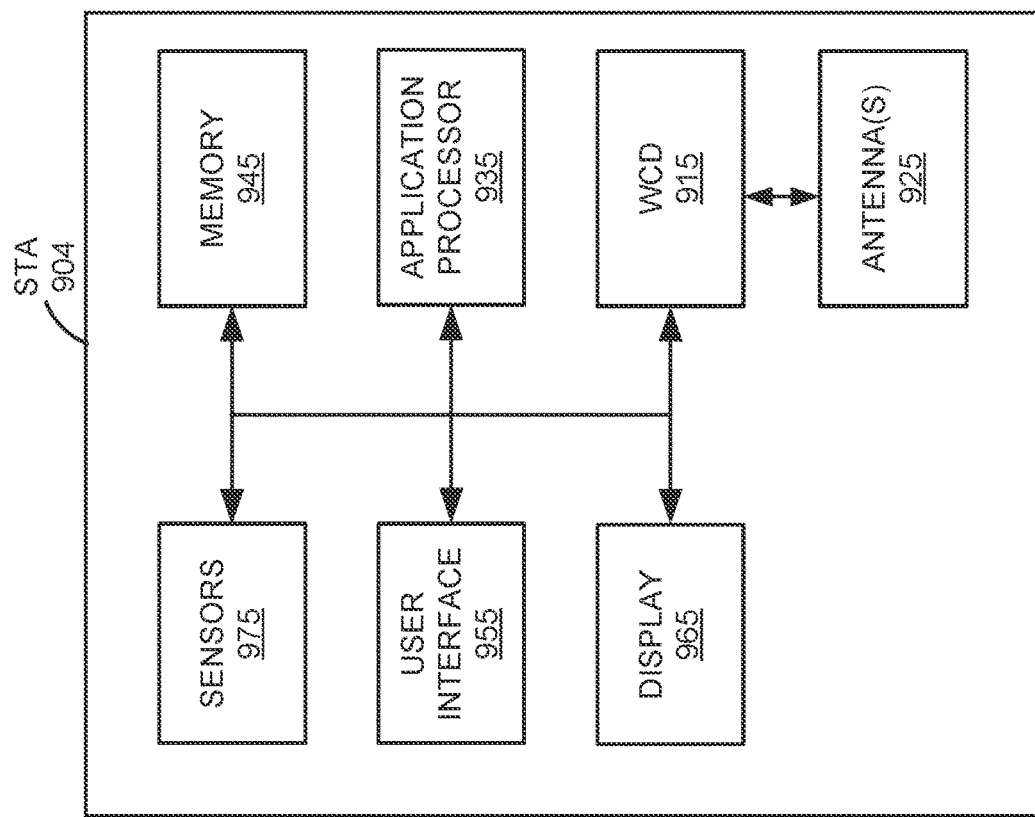
FIG. 9B shows a block diagram of an example STA.
Figure 9A:
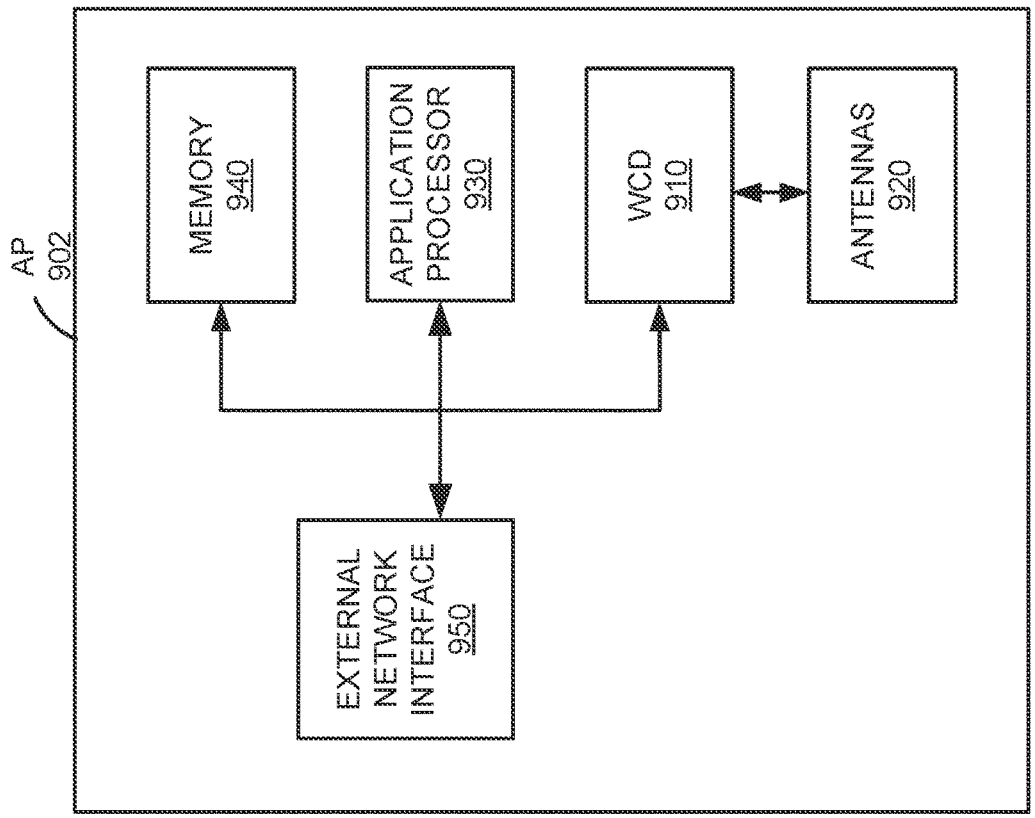
FIG. 9A shows a block diagram of an example AP.

FIG. 9A shows a block diagram of an example AP 902. For example, the AP 902 can be an example implementation of the AP 102 described with reference to FIG. 1. The AP 902 includes a wireless communication device (WCD) 910. For example, the wireless communication device 910 may be an example implementation of the wireless communication device 800 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 described with reference to FIG. 1. The STA 904 includes a wireless communication device 915. For example, the wireless communication device 915 may be an example implementation of the wireless communication device 800 described with reference to FIG. 8. The STA 904 also includes one or more antennas 925 coupled with the wireless communication device 915 to transmit and receive wireless communications. The STA 904 additionally includes an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

As described above, it is desirable to support multiple wireless communication protocols in a single communication via a wireless channel. Various implementations relate generally to formats, structures, and techniques for combining data communications formatted according to different wireless communication protocols in the same wireless channel. Some implementations more specifically relate to communication of a wireless packet that concurrently includes signaling and data for multiple wireless communication protocols that represent different generations of the WLAN communication protocol. For example, the wireless packet may be referred as a multi-generation PPDU. The multi-generation PPDU may include generation-specific preambles in different subchannels of the wireless channel. Additionally, or alternatively, some implementations more specifically relate to a compound PPDU that is formed from subchannel PPDUs based on different wireless communication protocols. The techniques in this disclosure enable communication using different generations of the IEEE 802.11 WLAN communication protocol, such that the communications for the different generations may be combined into a single PPDU or compound PPDU. In some implementations, the wireless packet may be formatted as a single PPDU in which a single data field spans the entire channel bandwidth following the preambles for the different generations. In some other implementations, the wireless packet may be formatted as a compound PPDU that is formed from PPDUs of different wireless communication protocols, each including a preamble and a data field based on a wireless communication protocol in a same respective subchannel, that are then transmitted concurrently. Particular implementations of the subject matter described in this disclosure can be implemented to realize one or more of the following potential advantages. As described initially above, the multi-generation PPDUs presented herein can support simultaneous communication to or from stations (STAs) that implement different generations of the WLAN communication protocols. As the WLAN communication protocols evolve to expand the channel bandwidth or to add other features, the multi-generation PPDUs may continue to enable communications formatted according to previous generations while supporting communications formatted using the new generations concurrently. Additionally, because the multi-generation PPDU may include multiple generations of preambles. RUs can be allocated with greater flexibility.

Figure 10:
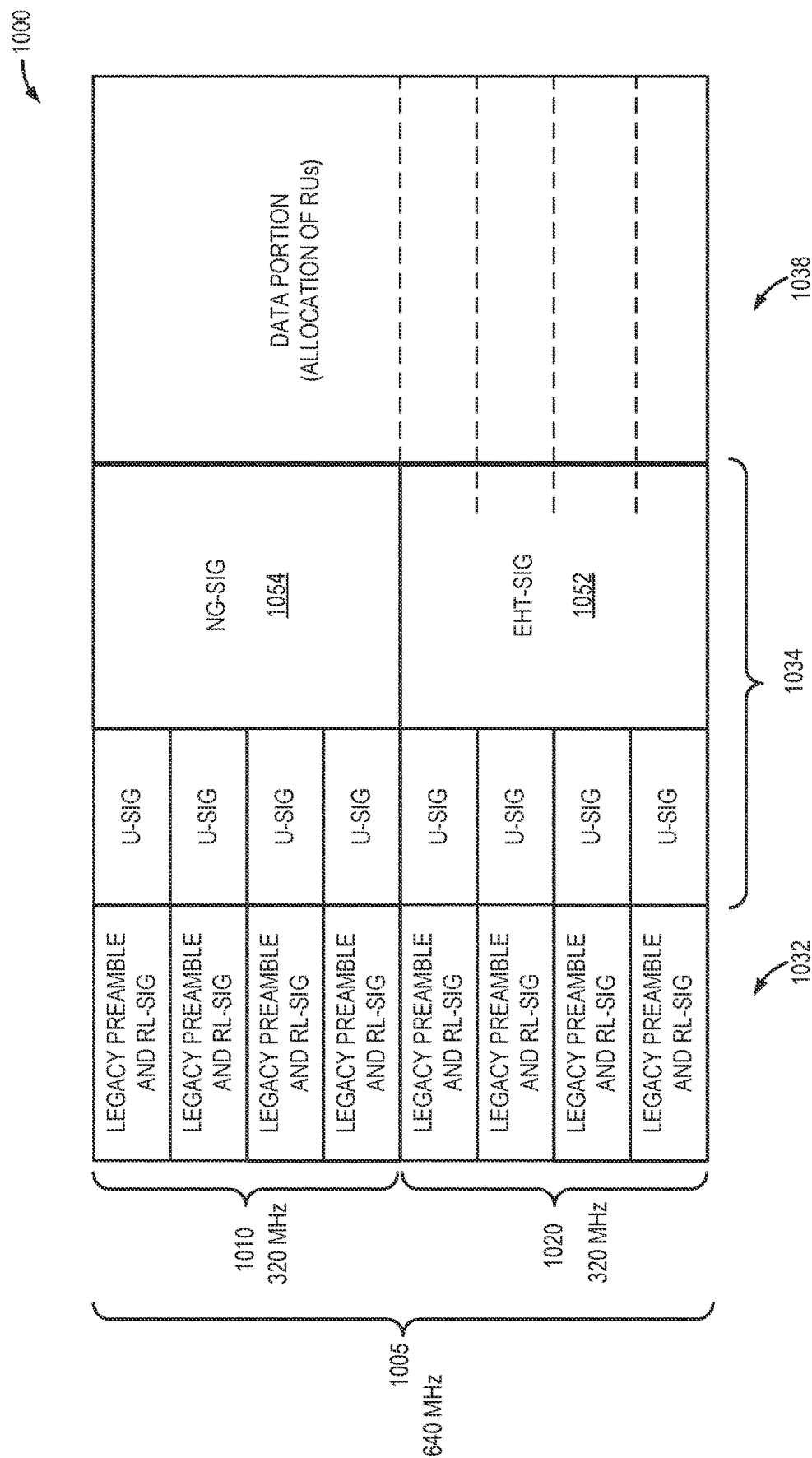
FIG. 10 shows an example wireless packet that supports greater than 320 MHz channel bandwidth according to some implementations.

FIG. 10 shows an example wireless packet 1000 that supports greater than 320) MHz channel bandwidth according to some implementations. In the example of FIG. 10, the channel bandwidth 1005 is 640 MHZ. A lower portion 1020 may be a 320 MHZ subchannel and an upper portion 1010 may be a 320 MHz subchannel. Within each subchannel, there may be different generation-specific signaling and formatting. The signaling and data fields may line up such that the generation-specific preambles 1034 and end of the data portions 1038 are aligned in time within the different subchannels. Furthermore, within each 320 MHz subchannel, there may be further division to create smaller subchannels. For example, the lower portion 1020 may include four 80 MHZ bandwidth subchannels. The lower portion 1020 may include legacy preamble portion 1032, followed by a first preamble that includes a U-SIG and EHT-SIG 1052. The U-SIG may be different for the different 80 MHZ bandwidth subchannels. The EHT-SIG 1052 may allocate RUs within the lower portion 1020 of the data portion 1038 in the wireless packet 1000. In some implementations, the EHT-SIG 1052 may allocate the RUs based on the 80 MHZ subchannels.

The upper portion 1010 may include the legacy preamble portion 1032 and U-SIG. Similar to the lower portion 1020, in the example of FIG. 10, the legacy preamble portion 1032 and U-SIG are parallelized in 80 MHz subchannels. A next generation signal field (NG-SIG) 1054 follows the U-SIGs. The NG-SIG 1054 may allocate RUs from within the upper portion 1010 as well as the lower portion 1020. In an example in which the wireless packet 1000 is transmitted by an AP, the AP may determine which RUs within the lower portion 1020 of the legacy preamble portion 1032 should remain unallocated in the EHT-SIG 1052 so that they can be allocated in the NG-SIG 1054.

The example of FIG. 10 is provided to illustrate an advantage of the multi-generation PPDU described as wireless packet 1000 when compared with traditional single-generation PPDUs. In a same transmission, an AP may communicate with STAs that implement the first preamble design and also with STAs that implement the second preamble design. Hypothetically, the second preamble may support RU allocation within a larger channel bandwidth compared to the first preamble. Therefore, the AP has more flexibility to schedule STAs within the wireless channel concurrently depending on which generation each STA supports and the resources available for each STA.

Figure 11:
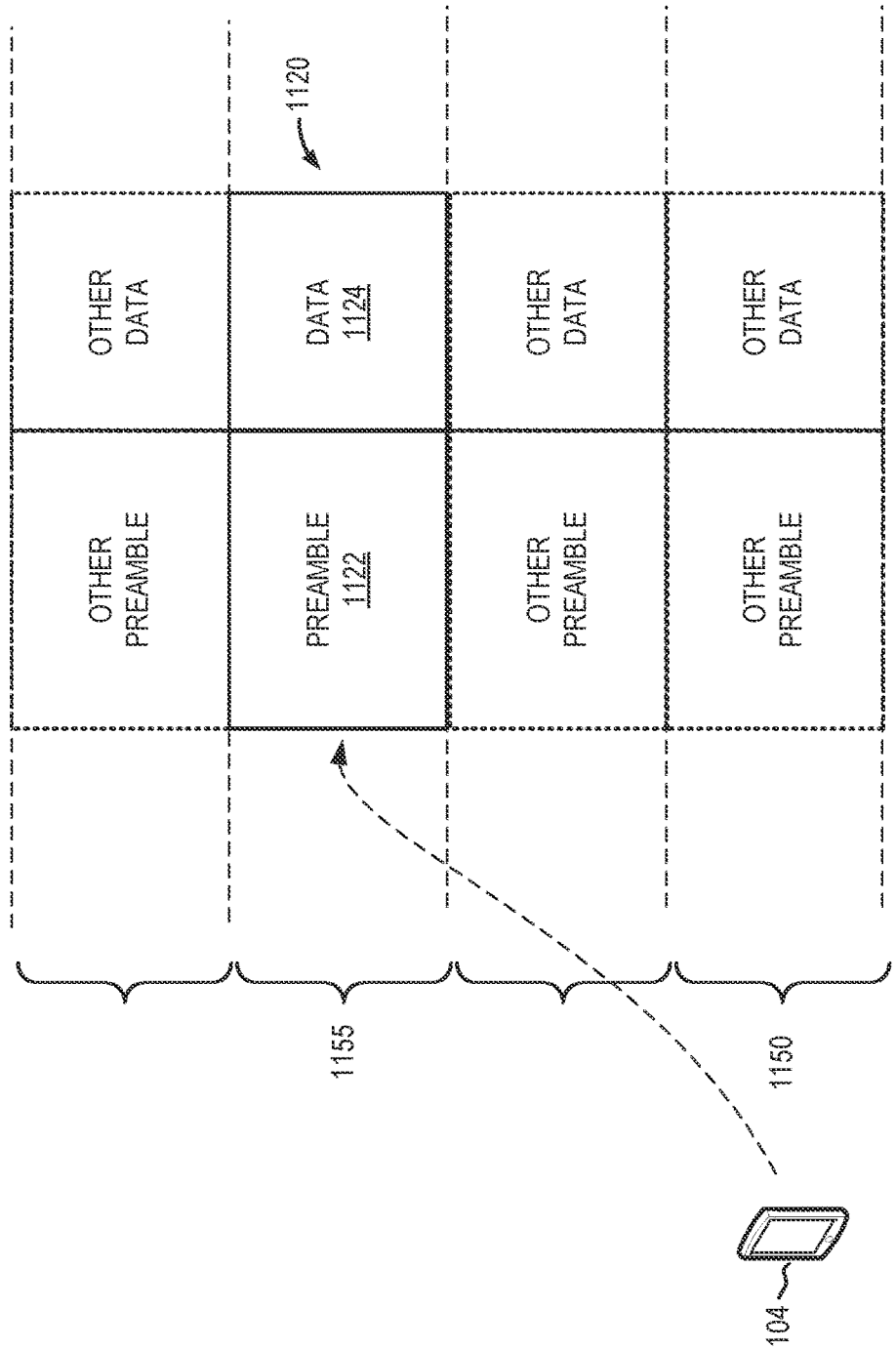
FIG. 11 shows an example of selective-bandwidth preamble decoding according to some implementations.

FIG. 11 shows an example of selective-bandwidth preamble decoding according to some implementations. Selective-bandwidth preamble decoding may enable a WLAN device to save power and improve reception of preamble signaling. A WLAN device may tune or monitor a particular subchannel and decode the preamble within that subchannel. In some implementations, the WLAN device may be tuned to a subchannel using RF tuning which involves MAC layer signaling and tuning time. Alternatively, or additionally, the WLAN device may tune to a subchannel using digital tuning in which the receiver radio obtains the full radio frequency signal but the receiver discards RF signals outside of the subchannel before processing and decoding the remaining RF signals. In the example of FIG. 11, a STA 104 may be configured to monitor a first subchannel 1155. In the first subchannel 1155, the STA may receive and process the generation-specific preamble 1122 and data field 1124. In some implementations, the STA 104 may treat the generation-specific preamble 1122 and data field 1124 as a stand-alone PPDU 1120, even though they are part of a multi-generation PPDU. As shown in FIG. 11, the first subchannel 1155 may be different from a primary subchannel 1150 normally associated with the wireless channel. The STA 104 may determine which subchannel (such as the first subchannel 1155) to monitor based on control signaling (not shown) in a previous transmission (not shown). For example, an AP may instruct the STA 104 to move from observing the primary subchannel 1150 and instead monitor the first subchannel 1155.

Figure 12:
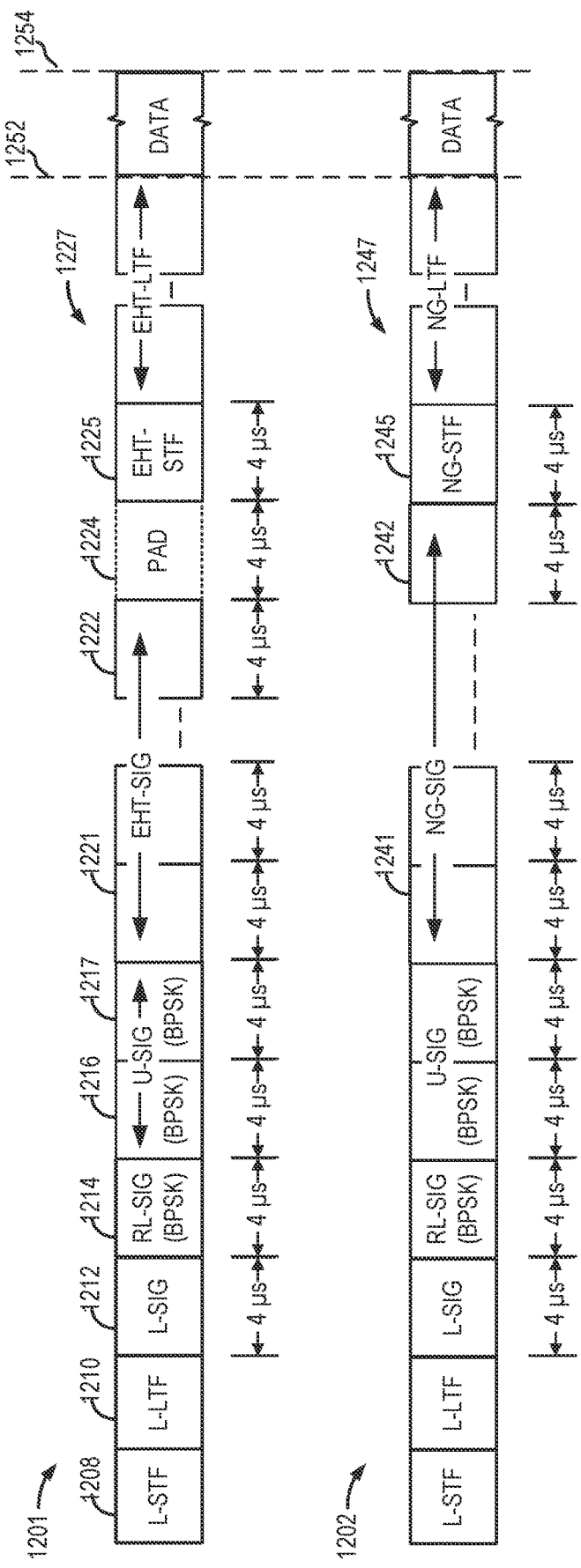
FIG. 12 shows an example of preamble orthogonality according to some implementations.

FIG. 12 shows an example of preamble orthogonality according to some implementations. For comparison purposes, a first subchannel PPDU 1201 is shown in relation to a second subchannel PPDU 1202. The first subchannel PPDU 1201 and second subchannel PPDU 1202 may be examples of the PPDUs with reference to FIG. 7A or 7B. However, the same concepts of preamble orthogonality apply to the multi-generation PPDUs that are not compound PPDUs, such as those described with reference to FIGS. 5 and 6. The preamble orthogonality enables the multi-generation PPDU to include generation-specific preambles that align in time and are orthogonal. For example, the generation-specific preambles may be the same duration and utilize consistently sized OFDM symbols. In some implementations, the preamble orthogonality may be achieved by using equal numbers of 1×, 2×, and 4× symbols (with the same guard interval) in the generation-specific preambles.

The first subchannel PPDU 1201 is shown as a series of OFDM symbols having a fixed cyclic prefix length. The first subchannel PPDU 1201 includes the L-STF 1208, the L-LTF 1210, the L-SIG 1212, and the RL-SIG 1214 followed by the U-SIG and EHT-SIG. The L-SIG 1212 and the RL-SIG 1214 may each be a single OFDM symbol. The U-SIG may occupy two OFDM symbols 1216 and 1217. The EHT-SIG may occupy multiple OFDM symbols 1221-1222. Following the EHT-SIG, the first preamble may include an OFDM symbol 1225 for an EHT-STF and one or more symbols 1227 for an EHT-LTF. The EHT-LTF also may be referred to as a generation-specific LTF. Each of the OFDM symbols before the generation specific LTF may have an OFDM symbol duration of 4 μs (which includes a 3.2 μs FFT duration plus a 0.8 μs cyclic prefix).

The second subchannel PPDU 1202 is also shown as a series of OFDM symbols having a same structure as the first subchannel PPDU 1201. Instead of the EHT-SIG, the second subchannel PPDU 1202 may have an NG-SIG that occupies multiple OFDM symbols 1241-1242. To maintain preamble orthogonality, when the first subchannel PPDU 1201 and the second subchannel PPDU 1202 are transmitted as part of a multi-generation PPDU, the generation-specific preambles should end at the same time 1252 and have the same symbol characteristics. Thus, in some implementations, a padding symbol 1224 may be added to one of the generation-specific signal fields so that the number of OFDM symbols is consistent for both of the generation-specific preambles. In some implementations a multi-user (MU) preamble design for each generation-specific preamble may be used because the MU preamble design is variable length and may support padding when needed to align the lengths of the generation-specific preambles. Continuing with the second subchannel PPDU 1202, after the NG-SIG, the second preamble may include an OFDM symbol 1245 for the NG-STF and one or more symbols for the NG-LTF 1247. The NG-LTF also may be referred to as a generation-specific LTF. Each of the OFDM symbols before the generation specific LTF may have an OFDM symbol duration of 4 μs (which includes a 3.2 μs FFT duration plus a 0.8 μs cyclic prefix).

Another aspect of preamble orthogonality is to align the pre-LTF OFDM symbols (referring to the generation specific LTFs). For example, both the first preamble and the second preamble may use Ix OFDM symbols having the same symbol duration and cyclic prefix for the pre-LTF OFDM symbols. Using the same OFDM symbol configuration and quantity of OFDM symbols for both the generation-specific preambles may ensure that the length of the pre-LTF OFDM symbols is consistent throughout the multi-generation PPDU.

In addition to aligning the end 1252 of the generation-specific preambles, in some implementations, a transmitting WLAN device may add padding the data portion so that the data fields (and thus the multi-generation PPDU) end at the same time 1254.

Figure 13:
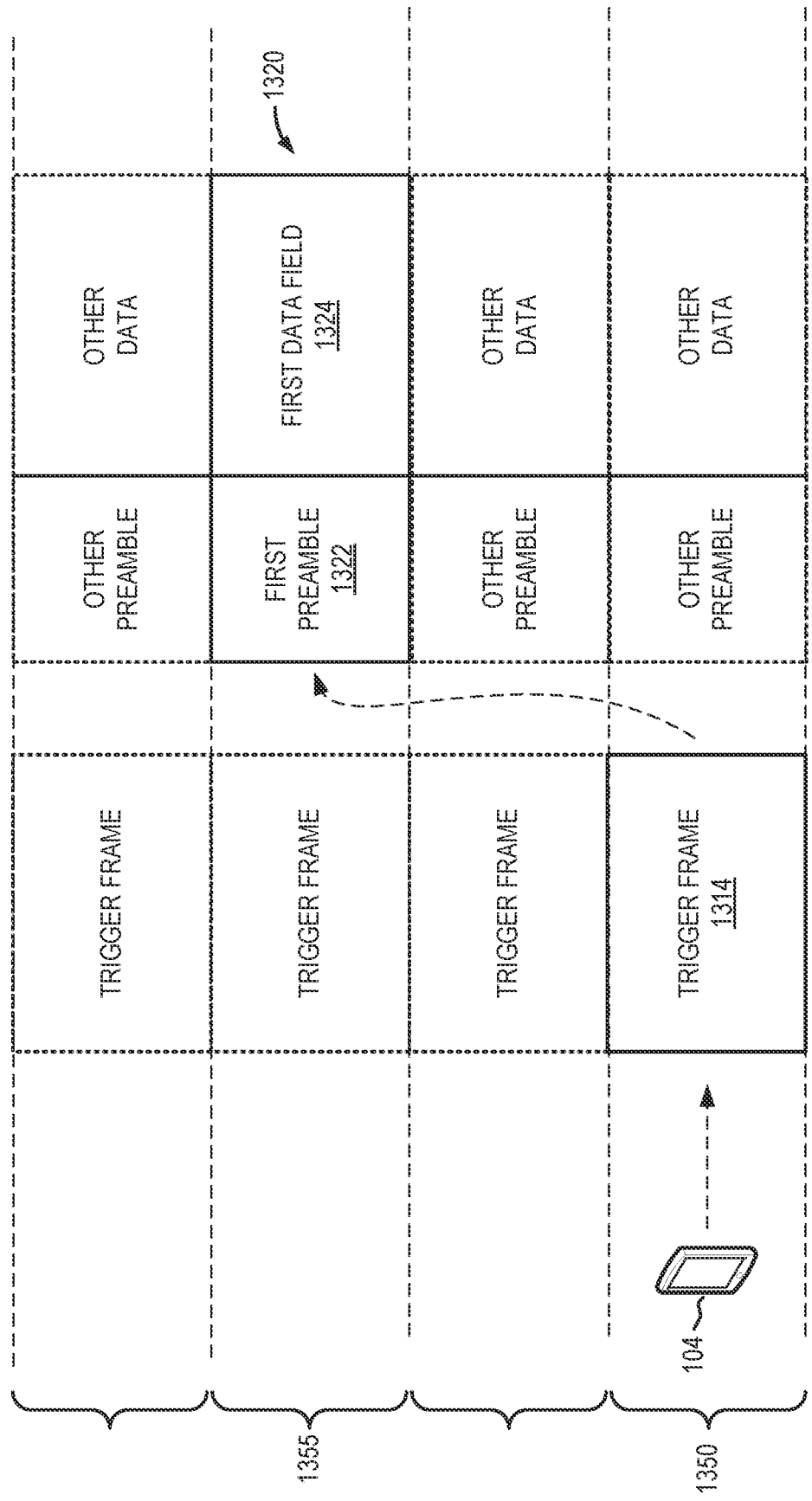
FIG. 13 shows an example of uplink communication according to some implementations.

FIG. 13 shows an example of uplink communication according to some implementations. A STA 104 may receive a trigger frame 1310 from an AP that controls the distribution of resources in the WLAN. The AP may use generation-specific preambles and signaling as described herein. In the example of FIG. 13, the STA 104 may be parked on a first subchannel 1350 and may use selective-bandwidth preamble processing as described with reference to FIG. 11. Thus, the STA 104 may observe the portion of the trigger frame 1310 in the first subchannel 1350, and may process that portion of the trigger frame 1310 as a generation-specific trigger frame 1314 according to a first wireless communication protocol. In the example of FIG. 13, the AP may signal for the STA 104 to transmit a multi-user (MU) uplink (UL) PPDU in a third subchannel 1355. Thus, the STA 104 may transmit the MU UL PPDU 1320 using a first preamble 1322 and first data field 1324. The UL MU PPDU 1320 may be an example of a generation-specific PPDU as described herein. Furthermore, the trigger frame 1310 may direct other STAs (not shown) to transmit different generation-specific PPDUs in the other subchannels.

To ensure that preamble orthogonality is maintained, in some implementations, the trigger frame 1314 may include additional signaling regarding the length of the first preamble 1322 or the first data field 1324 (or both). For example, the AP may determine the maximum length from among the preambles in the various subchannels and send a preamble length value in the trigger frame 1310. Thus, the STA 104 can determine the length of the first preamble 1322 based on the preamble length value indicated in the trigger frame 1314. If the first preamble 1322 is shorter than the prescribed length, the STA 104 may add padding to the first preamble 1322 to ensure that it matches the prescribed length. Similarly, a data field length value may be signaled in the trigger frame 1314 and the STA 104 may extend the first data field 1324 as needed to match the prescribed length. One reason for signaling the preamble length value and data field length value is so that the AP can inform all the STAs (not shown) regarding the prescribed lengths so that all of the uplink PPDUs in the various subchannels will have preambles that end at the same time and share the same OFDM symbols and so that the data fields end at the same time.

Figure 14:
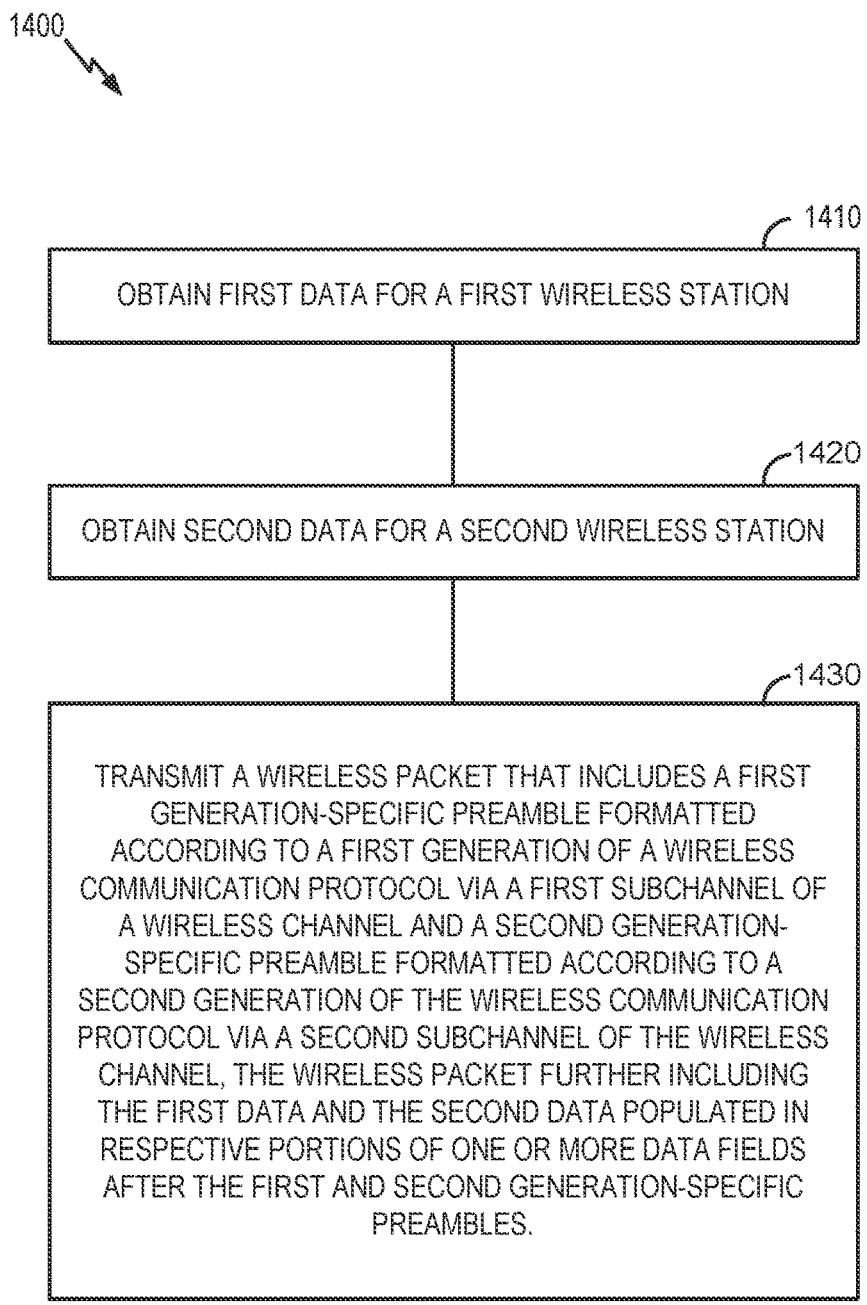
FIG. 14 shows a flowchart illustrating an example process for transmitting a wireless packet according to some implementations.

FIG. 14 shows a flowchart illustrating an example process 1400 for receiving a wireless packet according to some implementations. The process 1400 may be performed by a wireless communication device such as the wireless communication device 800 described above with reference to FIG. 8. In some implementations, the process 1400 may be performed by a wireless communication device operating as or within an AP, such as one of the APs 102 and 902 described above with reference to FIGS. 1 and 9A, respectively. In some implementations, the process 1400 may be performed by a wireless communication device operating as or within a STA, such as one of the STAs 104 and 904 described above with reference to FIGS. 1 and 9B, respectively.

In some implementations, the process 1400 begins in block 1410 with obtaining first data for a first wireless station. In block 1420, the process 1400 proceeds with obtaining second data for a second wireless station. In block 1430, the process 1400 proceeds with transmitting a wireless packet that includes a first generation-specific preamble formatted according to a first generation of a wireless communication protocol via a first subchannel of a wireless channel and a second generation-specific preamble formatted according to a second generation of the wireless communication protocol via a second subchannel of the wireless channel. The wireless packet may include the first data and the second data populated in respective portions (such as RUs) in one or more data fields after the first and second generation-specific preambles.

Figure 15:
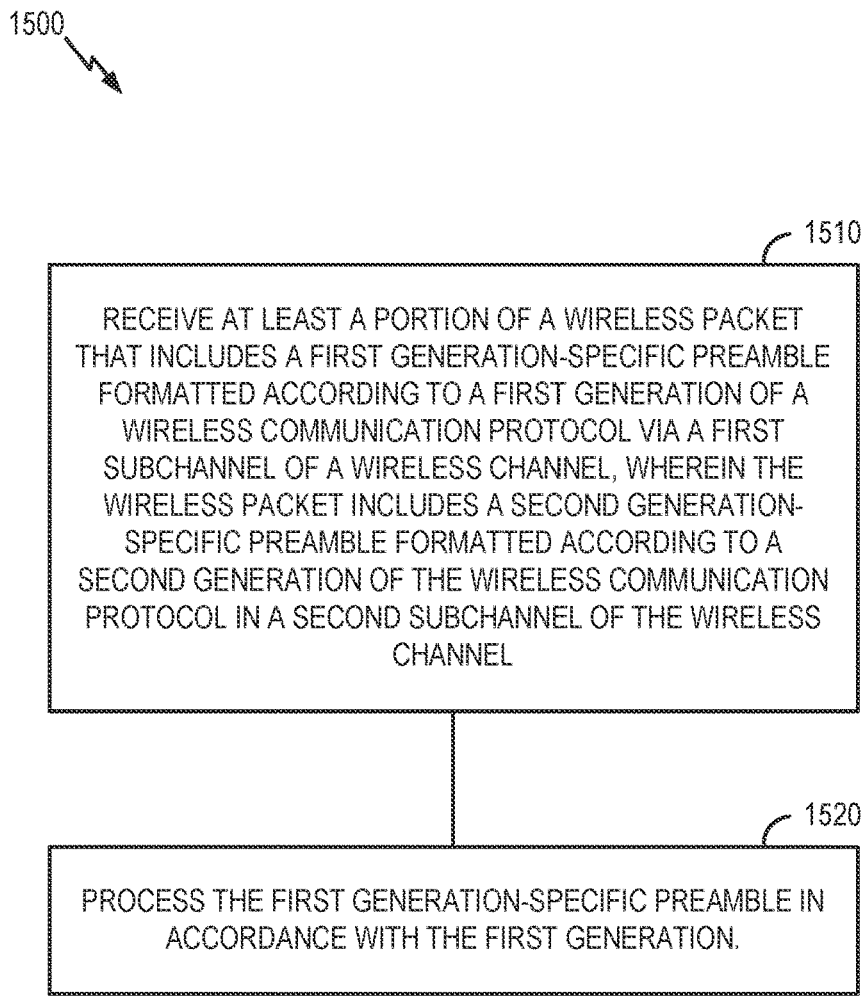
FIG. 15 shows a flowchart illustrating an example process for receiving a wireless packet according to some implementations.

FIG. 15 shows a flowchart illustrating an example process 1500 for receiving a wireless packet according to some implementations. The process 1500 may be performed by a wireless communication device such as the wireless communication device 800 described above with reference to FIG. 8. In some implementations, the process 1500 may be performed by a wireless communication device operating as or within an AP, such as one of the APs 102 and 902 described above with reference to FIGS. 1 and 9A, respectively. In some implementations, the process 1500 may be performed by a wireless communication device operating as or within a STA, such as one of the STAs 104 and 904 described above with reference to FIGS. 1 and 9B, respectively.

In some implementations, the process 1500 begins in block 1510 with receiving at least a portion of a wireless packet that includes a first generation-specific preamble formatted according to a first generation of a wireless communication protocol via a first subchannel of a wireless channel. The wireless packet may include a second generation-specific preamble formatted according to a second generation of the wireless communication protocol in a second subchannel of the wireless channel. In block 1520, the process 1500 proceeds with processing the first generation-specific preamble in accordance with the first generation.

Figure 16:
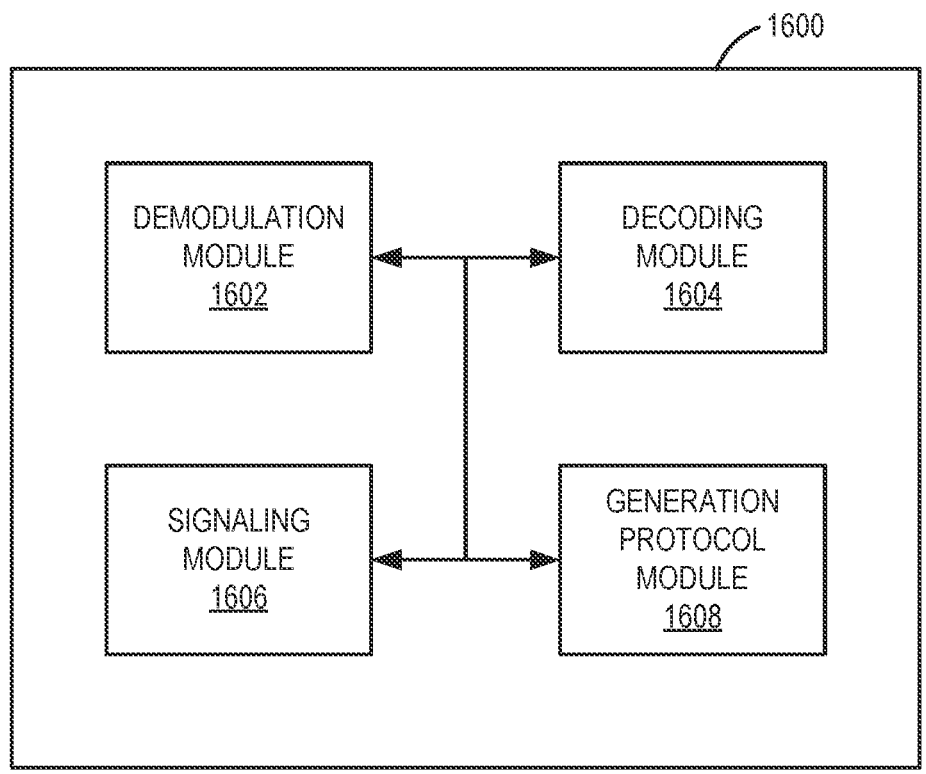
FIG. 16 shows a block diagram of an example wireless communication device according to some implementations.

FIG. 16 shows a block diagram of an example wireless communication device 1600 according to some implementations. In some implementations, the wireless communication device 1600 is configured to perform one or more of the processes described above. The wireless communication device 1600 may be an example implementation of the wireless communication device 800 described above with reference to FIG. 8. For example, the wireless communication device 1600 can be a chip, SoC, chipset, package or device that includes at least one processor and at least one modem (for example, a Wi-Fi (IEEE 802.11) modem or a cellular modem). In some implementations, the wireless communication device 1600 can be a device for use in an AP, such as one of the APs 102 and 902 described above with reference to FIGS. 1 and 9A, respectively. In some implementations, the wireless communication device 1600 can be a device for use in a STA, such as one of the STAs 104 and 904 described above with reference to FIGS. 1 and 9B, respectively. In some other implementations, the wireless communication device 1600 can be an AP or a STA that includes such a chip, SoC, chipset, package or device as well as at least one transmitter, at least one receiver, and at least one antenna.

The wireless communication device 1600 includes a demodulation module 1602, a decoding module 1604, a signaling module 1606 and a generation protocol module 1608. Portions of one or more of the modules 1602, 1604, 1606 and 1608 may be implemented at least in part in hardware or firmware. For example, the demodulation module 1602, the decoding module 1604, the signaling module 1606 and the generation protocol module 1608 may be implemented at least in part by a modem (such as the modem 802). In some implementations, portions of some of the modules 1602, 1604, 1606 or 1608 may be implemented at least in part as software stored in a memory (such as the memory 808). For example, portions of one or more of the modules 1602, 1604, 1606 or 1608 can be implemented as non-transitory instructions (or "code") executable by a processor (such as the processor 806) to perform the functions or operations of the respective module.

The demodulation module 1602 is configured to receive at least part of a multi-generation PPDU according to the generation of WLAN communication protocols implemented by the generation protocol module 1608. The demodulation module 1602 is configured to demodulate the symbols in the received packet and to determine the modulation scheme that was used to module the symbols. The decoding module 1604 is configured to decode the bits in the demodulated symbols and to interpret bits in the decoded bits based on a WLAN communication protocol.

The signaling module 1606 is configured to interpret signal fields of a generation-specific preamble in the multi-generation PPDU in accordance with the implementations described above. The generation protocol module 1608 is configured to receive and process at least part of a multi-generation PPDU according to a generation of the WLAN communication protocols supported by the wireless communication device 1600.

Figure 17:
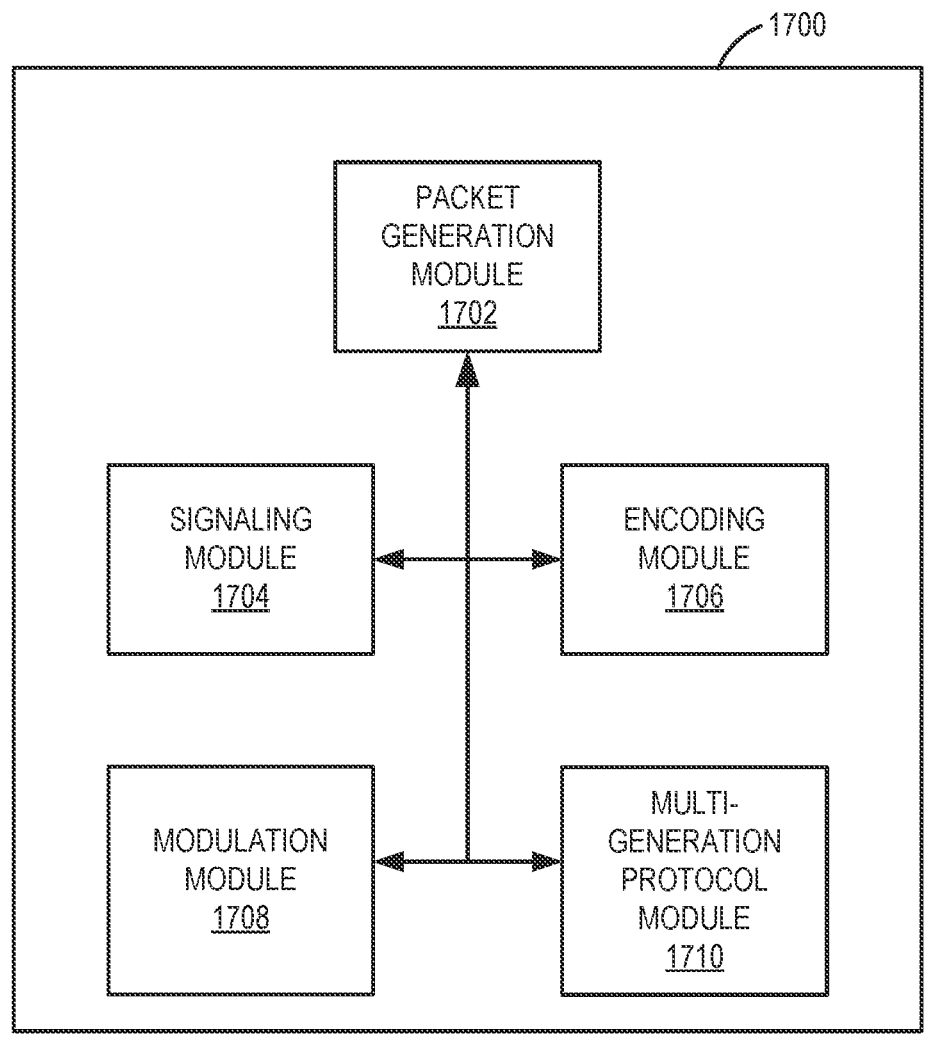
FIG. 17 shows a block diagram of an example wireless communication device according to some implementations.

FIG. 17 shows a block diagram of an example wireless communication device 1700 according to some implementations. In some implementations, the wireless communication device 1700 is configured to perform one or more of the processes described above. The wireless communication device 1700 may be an example implementation of the wireless communication device 800 described above with reference to FIG. 8. For example, the wireless communication device 1700 can be a chip, SoC, chipset, package or device that includes at least one processor and at least one modem (for example, a Wi-Fi (IEEE 802.11) modem or a cellular modem). In some implementations, the wireless communication device 1700 can be a device for use in an AP, such as one of the APs 102 and 902 described above with reference to FIGS. 1 and 9A, respectively. In some implementations, the wireless communication device 1700 can be a device for use in a STA, such as one of the STAs 104 and 904 described above with reference to FIGS. 1 and 9B, respectively. In some other implementations, the wireless communication device 1700 can be an AP or a STA that includes such a chip, SoC, chipset, package or device as well as at least one transmitter, at least one receiver, and at least one antenna.

The wireless communication device 1700 includes a packet generation module 1702, a signaling module 1704, an encoding module 1706, a modulation module 1708 and a multi-generation protocol module 1710. Portions of one or more of the modules 1702, 1704, 1706, 1708 and 1710 may be implemented at least in part in hardware or firmware. For example, the packet generation module 1702, the signaling module 1704, the encoding module 1706, the modulation module 1708 and the multi-generation protocol module 1710 may be implemented at least in part by a modem (such as the modem 802). In some implementations, portions of some of the modules 1702, 1704, 1706, 1708 or 1710 may be implemented at least in part as software stored in a memory (such as the memory 808). For example, portions of one or more of the modules 1702, 1704, 1706 or 1708 can be implemented as non-transitory instructions (or "code") executable by a processor (such as the processor 806) to perform the functions or operations of the respective module.

The packet generation module 1702 is configured to generate a multi-generation PPDU according to any of the examples described herein. The signaling module 1704 is configured to prepare signal fields for the PPDU in accordance with the implementations described above. For example, the signaling module 1704 may prepare the generation-specific signaling to include in a generation preamble. The modulation module 1708 is configured to modulate the symbols in the generated PPDU. The multi-generation protocol module 1710 is configured to implement one or more generations of WLAN communication protocols.

Figure 18:
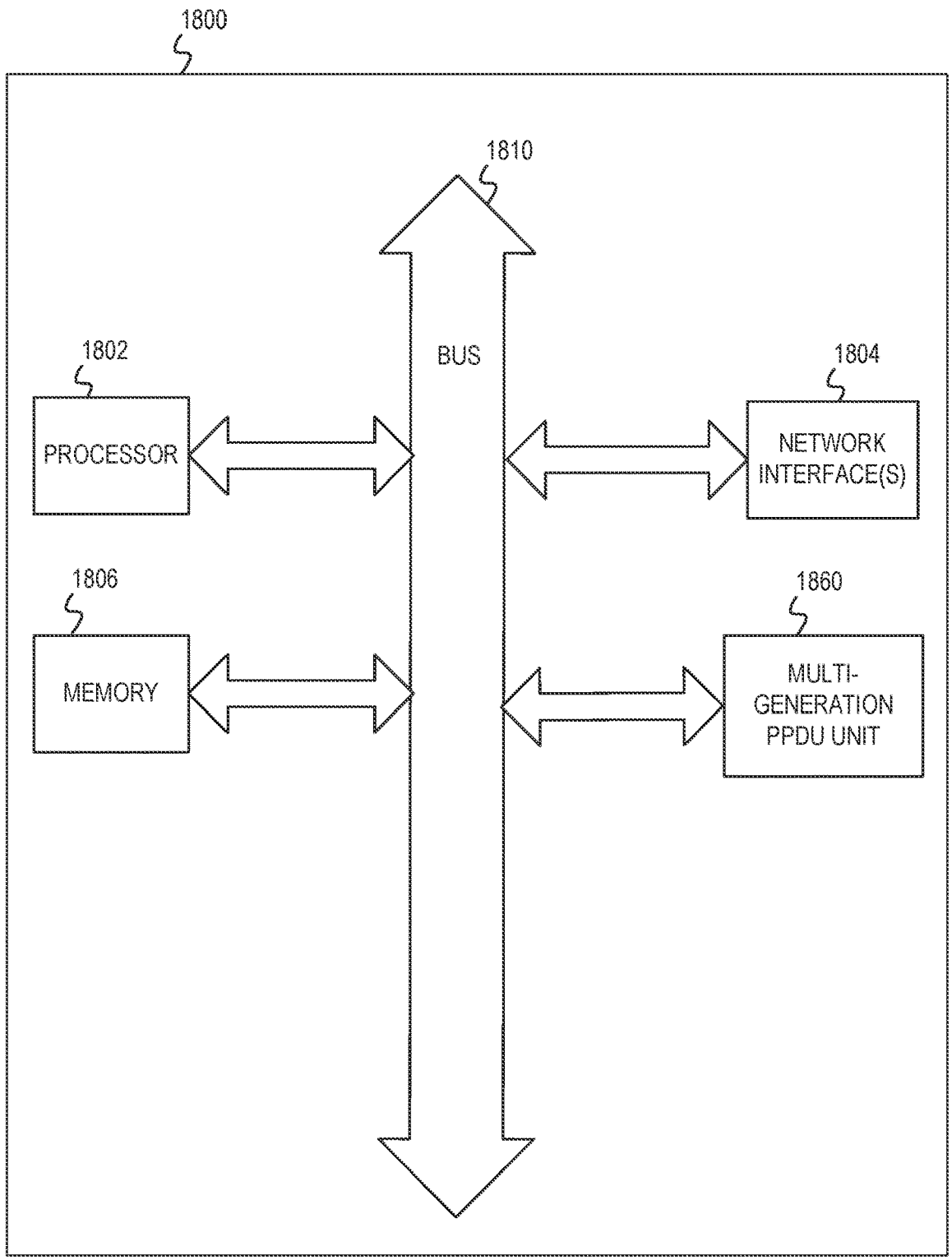
FIG. 18 shows a block diagram of an example electronic device.

FIG. 18 shows a block diagram of an example electronic device. In some implementations, the electronic device 1800 may be one of an access point (including any of the APs described herein), a range extender, or other electronic systems. The electronic device 1800 can include a processor 1802 (possibly including multiple processors, multiple cores, multiple nodes, or implementing multi-threading, etc.). The electronic device 1800 also can include a memory 1806. The memory 1806 may be system memory or any one or more of the possible realizations of computer-readable media described herein. The electronic device 1800 also can include a bus 1810 (such as PCI, ISA, PCI-Express, Hyper-Transport®, InfiniBand®, NuBus, ® AHB, AXI, etc.), and a network interface 1804 that can include at least one of a wireless network interface (such as a WLAN interface, a Bluetooth®; interface, a WiMAX® interface, a ZigBee® interface, a Wireless USB interface, etc.) and a wired network interface (such as an Ethernet interface, a powerline communication interface, etc.). In some implementations, the electronic device 1800 may support multiple network interfaces—each of which is configured to couple the electronic device 1800 to a different communication network.

The electronic device 1800 may include a multi-generation PPDU unit 1860. In some implementations, the multi-generation PPDU unit 1860 may be distributed within the processor 1802, the memory 1806, and the bus 1810. The multi-generation PPDU unit 1860) may perform some or all of the operations described herein. For example, the multi-generation PPDU unit 1860 may generate a multi-generation PPDU according to any of the examples herein. Alternatively, or additionally, the multi-generation PPDU unit 1860 may be configured to receive and process at least part of a multi-generation PPDU.

The memory 1806 can include computer instructions executable by the processor 1802 to implement the functionality of the implementations described in FIGS. 1-17. Any of these functionalities may be partially (or entirely) implemented in hardware or on the processor 1802. For example, the functionality may be implemented with an application-specific integrated circuit, in logic implemented in the processor 1802, in a co-processor on a peripheral device or card, etc. Further, realizations may include fewer or additional components not illustrated in FIG. 18 (such as video cards, audio cards, additional network interfaces, peripheral devices, etc.). The processor 1802, the memory 1806, and the network interface 1804 may be coupled to the bus 1810. Although illustrated as being coupled to the bus 1810, the memory 1806 may be coupled to the processor 1802.

FIGS. 1-18 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (identified as clauses for reference).

Clauses

Clause 1. A method for wireless communication by an access point (AP) of a wireless local area network (WLAN), comprising: obtaining first data for a first wireless station: obtaining second data for a second wireless station: and transmitting a wireless packet that includes a first generation-specific preamble formatted according to a first generation of a wireless communication protocol via a first subchannel of a wireless channel and a second generation-specific preamble formatted according to a second generation of the wireless communication protocol via a second subchannel of the wireless channel, the wireless packet further including the first data and the second data populated in respective portions of one or more data fields after the first and second generation-specific preambles.

Clause 2. The method of clause 1, further comprising including first generation-specific signaling in the first generation-specific preamble to indicate a first resource unit (RU) in the one or more data fields of the wireless packet that are allocated to the first wireless station: and including second generation-specific signaling in the second generation-specific preamble to indicate a second RU allocated to the second wireless station.

Clause 3. The method of clause 2, where the first generation-specific signaling indicates a first plurality of RUs that are allocated to a first plurality of wireless stations, including the first wireless station, respectively, and where the second generation-specific signaling indicates a second plurality of RUs that are allocated to a second plurality of wireless stations, including the second wireless station, respectively.

Clause 4. The method of clause 3, further comprising: limiting the first plurality of RUs signaled in the first generation-specific signaling to a bandwidth of the first subchannel.

Clause 5. The method of clause 4, further comprising: allocating at least one RU that is within the bandwidth of the first subchannel in the second plurality of RUs signaled in the second generation-specific signaling, where the one or more data fields includes a single data field that spans at least the first subchannel and the second subchannel.

Clause 6. The method of clause 1, where the wireless packet is formatted as a compound physical layer protocol data unit (PPDU), the method further comprising: transmitting a first PPDU formatted according to the first generation via the first subchannel and a second PPDU formatted according to the second generation via the second subchannel, concurrently, to form the compound PPDU.

Clause 7. The method of clause 6, where the first PPDU that includes the first generation-specific preamble followed by a first data field in the first subchannel, and the second PPDU includes the second generation-specific preamble followed by a second data field in the second subchannel.

Clause 8. The method of clause 7, where the first generation-specific preamble of the first PPDU includes signaling for resource units (RUS) in the first data field based on a bandwidth of the first subchannel, and where the second generation-specific preamble of the second PPDU includes signaling for RUs in the second data field based on a bandwidth of the second subchannel.

Clause 9. The method of clause 7, further comprising: padding a shorter one of the first data field or the second data field to make respective lengths of the first data field and the second data field the same such that the first PPDU and the second PPDU end concurrently.

Clause 10. The method of clause 1, further comprising: padding a shorter one of the first generation-specific preamble or the second generation-specific preamble to make respective lengths of the first generation-specific preamble and the second generation-specific preamble the same such that the first and second generation-specific preambles end concurrently.

Clause 11. The method of clause 1, where the first generation-specific preamble and the second generation-specific preamble are output using orthogonal frequency division multiplexing (OFDM) symbols that span the first subchannel and the second subchannel.

Clause 12. The method of clauses 1, where a first bandwidth size of the first subchannel is different from a second bandwidth size of the second subchannel, and where each of the first subchannel and the second subchannel have a bandwidth size that is a multiple of 80 MHZ bandwidth.

Clause 13. The method of clause 1, further comprising, before transmitting the wireless packet: transmitting a control message informing the first wireless station to decode the first generation-specific preamble on the first subchannel according to the first generation such that the first wireless station disregards the second generation-specific preamble on the second subchannel.

Clause 14. The method of clause 1, where the first generation of the wireless communication protocol is a based on Institute of Electrical and Electronics Engineers (IEEE) 802.11 be amendment to IEEE 802.11 technical standard specification, and the first generation-specific preamble includes a universal signal (U-SIG) field followed by an Extremely High Throughput (EHT) signal (EHT-SIG) field, and where the second generation of the wireless communication protocol is based on a different amendment to the IEEE 802.11 technical standard specification.

Clause 15. The method of clause 1, further comprising: transmitting a trigger frame to at least the first wireless station and the second wireless station, the trigger frame informing the first wireless station to transmit a first uplink (UL) physical layer protocol data unit (UL PPDU) via the first subchannel and further informing the second wireless station to transmit a second UL PPDU via the second subchannel: and receiving the first UL PPDU from the first wireless station via the first subchannel and the second UL PPDU from the second wireless station via the second subchannel, concurrently, where the first UL PPDU is formatted according to the first generation and the second UL PPDU is formatted according to the second generation.

Clause 16. The method of clause 15, where the trigger frame indicates lengths for a first UL preamble and a first UL data field of the first UL PPDU such that the lengths of the first UL preamble and the first UL data field of the first UL PPDU received via the first subchannel align with corresponding lengths of a second UL preamble and a second UL data field of the second UL PPDU received in the second subchannel.

Clause 17. A method for wireless communication by an apparatus of a wireless station, comprising: receiving at least a portion of a wireless packet that includes a first generation-specific preamble formatted according to a first generation of a wireless communication protocol via a first subchannel of a wireless channel, where the wireless packet includes a second generation-specific preamble formatted according to a second generation of the wireless communication protocol in a second subchannel of the wireless channel: and processing the first generation-specific preamble in accordance with the first generation.

Clause 18. The method of clause 17, further comprising: disregarding the second generation-specific preamble in the second subchannel.

Clause 19. The method of clause 17, where the wireless packet is a compound multi-generation physical layer protocol data unit (PPDU) that includes a first PPDU in the first subchannel formatted according to the first generation and a second PPDU in the second subchannel formatted according to the second generation.

Clause 20. The method of clause 17, further comprising: receiving, before the wireless packet, a control message that instructs the wireless station to monitor for and receive the first preamble in the first subchannel, where the wireless station is configured to disregard subchannels other than the first subchannel when receiving the wireless packet.

Clause 21. The method of clause 17, further comprising: receiving a trigger frame that informs the wireless station to transmit a first uplink (UL) physical layer protocol data unit (PPDU) via the first subchannel: and transmitting the first UL PPDU via the first subchannel, where the MU UL PPDU is formatted according to the first generation.

Clause 22. The method of clause 21, where the trigger frame indicates lengths for a first UL preamble and a first UL data field of the first UL PPDU such that the lengths of the first UL preamble and the first UL data field align with corresponding lengths of a second UL preamble and a second UL data field of a second UL PPDU from a different wireless station in the second subchannel.

Clause 23. An access point including: at least one processor configured to: obtain first data for a first wireless station, and obtain second data for a second wireless station: and at least one modem communicatively coupled with the at least one processor and configured to output a wireless packet that includes a first generation-specific preamble formatted according to a first generation of a wireless communication protocol via a first subchannel of a wireless channel and a second generation-specific preamble formatted according to a second generation of the wireless communication protocol via a second subchannel of the wireless channel, the wireless packet further including the first data and the second data populated in respective portions of one or more data fields after the first and second generation-specific preambles.

Clause 24. The access point of clause 23, where the at least processor is further configured to: include first generation-specific signaling in the first generation-specific preamble to indicate a first resource unit (RU) allocated to the first wireless station; and include second generation-specific signaling in the second generation-specific preamble to indicate a second RU allocated to the second wireless station.

Clause 25. The access point of clause 23, where the wireless packet is formatted as a compound physical layer protocol data unit (PPDU), and where the at least one modem is configured to output a first PPDU formatted according to the first generation via the first subchannel and a second PPDU formatted according to the second generation via the second subchannel, concurrently, to form the compound PPDU.

Clause 26. The access point of clause 25, where the first PPDU that includes the first generation-specific preamble followed by a first data field in the first subchannel, and the second PPDU includes the second generation-specific preamble followed by a second data field in the second subchannel.

Clause 27. The access point of clause 23, further comprising: at least one memory communicatively coupled with the at least one processor and storing processor-readable code: at least one transceiver coupled to the at least one modem: at least one antenna coupled to the at least one transceiver to wirelessly transmit signals output from the at least one transceiver and to wirelessly receive signals for input into the at least one transceiver: and a housing that encompasses the at least one modem, the at least one processor, the at least one memory, the at least one transceiver and at least a portion of the at least one antenna.

Clause 28. A wireless station comprising: at least one modem configured to obtain at least a portion of a wireless packet that includes a first generation-specific preamble formatted according to a first generation of a wireless communication protocol via a first subchannel of a wireless channel, where the wireless packet includes a second generation-specific preamble formatted according to a second generation of the wireless communication protocol in a second subchannel of the wireless channel: and at least one processor communicatively coupled with the at least one modem and configured to process the first generation-specific preamble in accordance with the first generation.

Clause 29. The wireless station of clause 28, further comprising: the at least one modem configured to obtain, before the wireless packet, a control message: and the at least one processor configured to: process the control message, cause the at least one modem to monitor for and receive the first preamble in the first subchannel based on an instruction in the control message, and cause the at least one modem to disregard subchannels other than the first subchannel.

Clause 30. The wireless station of clause 28, further comprising: at least one memory communicatively coupled with the at least one processor and storing processor-readable code: at least one transceiver coupled to the at least one modem: at least one antenna coupled to the at least one transceiver to wirelessly transmit signals output from the at least one transceiver and to wirelessly receive signals for input into the at least one transceiver; and a housing that encompasses the at least one modem, the at least one processor, the at least one memory, the at least one transceiver and at least a portion of the at least one antenna.

Clause 31. A method for wireless communication by an apparatus of a first wireless local area network (WLAN), including: obtaining first data for a first wireless station and second data for a second wireless station: determining a first wireless communication protocol for transmitting the first data to the first wireless station and a second wireless communication protocol for transmitting the second data to the second wireless station; generating a first preamble based on the first wireless communication protocol and a second preamble based on the second wireless communication protocol: generating one or more data fields including resource allocations for communicating the first data and the second data based on the first wireless communication protocol and the second wireless communication protocol: and transmitting, via a wireless channel that includes a first subchannel and a second subchannel, a wireless packet that includes the first preamble in the first subchannel and the second preamble in the second subchannel, the wireless packet further including the one or more data fields after the first preamble and the second preamble.

Clause 32. The method of clause 31, where the first preamble includes signaling for a first resource unit (RU) in the one or more data fields of the wireless packet that are allocated to the first wireless station, and where the second preamble includes signaling for a second RU in the one or more data fields of the wireless packet that are allocated to the second wireless station.

Clause 33. The method of clause 32, where the first preamble includes signaling for a first plurality of RUs that are allocated to a first plurality of wireless stations, including the first wireless station, respectively, based on the first wireless communication protocol, and where the second preamble includes signaling for a second plurality of RUs that are allocated to a second plurality of wireless stations, including the second wireless station, respectively based on the second wireless communication protocol.

Clause 34. The method of clause 33, where the first plurality of RUs signaled in the first preamble are limited to a bandwidth of the first subchannel within the single data field.

Clause 35. The method of any one of clauses 33-34, where the second plurality of RUs signaled in the second preamble include at least one allocated RU that is within the bandwidth of the first subchannel.

Clause 36. The method of any one of clauses 32-35, where the one or more data fields consist of a single data field that spans an entire bandwidth of the wireless channel.

Clause 37. The method of any one of clauses 31-36, where the wireless packet is a multi-generation physical layer convergence protocol (PLCP) protocol data unit (PPDU) formatted as a single PPDU.

Clause 38. The method of clause any one of clauses 1-3, where the wireless packet includes a first PPDU that includes the first preamble followed by a first data field in the first subchannel, and a second PPDU that includes the second preamble followed by a second data field in the second subchannel, and where the first PPDU and the second PPDU are concurrently output via the first subchannel and the second subchannel, respectively, to form a compound PPDU.

Clause 39. The method of clause 38, where the wireless packet is a multi-generation physical layer convergence protocol (PLCP) protocol data unit (PPDU) formatted as a compound PPDU in which each subchannel includes signaling and data fields that can be decoded as a separate PPDU.

Clause 40. The method of any one of clauses 38-39, where the first preamble of the first PPDU includes signaling for resource units (RUs) in the first data field, where the second preamble of the second PPDU includes signaling for RUs in the second data field, and where the signaling for the RUs in the first preamble and the second preamble is based on bandwidths of the first data field and the second data field, respectively.

Clause 41. The method of any one of clauses 38-40, further including: determining lengths for each of the first data field and the second data field: and padding a shorter one of the first data field or the second data field to make the lengths of the first data field and the second data field the same such that the first PPDU and the second PPDU end concurrently.

Clause 42. The method of any one of clauses 31-41, where the first preamble and the second preamble are concurrently output using orthogonal frequency division multiplexing (OFDM) symbols that include the first subchannel and the second subchannel.

Clause 43. The method of any one of clauses 31-42, further including: determining lengths for each of the first preamble and the second preamble: and padding a shorter one of the first preamble or the second preamble to make the lengths of the first preamble and the second preamble the same.

Clause 44. The method of any one of clauses 31-43, where a first bandwidth size of the first subchannel is different from a second bandwidth size of the second subchannel.

Clause 45. The method of any one of clauses 31-44, where each of the first subchannel and the second subchannel have a bandwidth size that is a multiple of 80 MHZ bandwidth.

Clause 46. The method of any one of clauses 31-45, where a channel bandwidth of the wireless channel is greater than 320 MHZ, and where a bandwidth size of at least one of the first subchannel and the second subchannel is limited to 320 MHz bandwidth.

Clause 47. The method of any one of clauses 31-46, where the first WLAN device is an access point (AP), the method further including, before outputting the wireless packet: causing the first wireless station to monitor the first subchannel and decode the first preamble on the first subchannel without decoding the second preamble.

Clause 48. The method of any one of clauses 31-47, where the first communication protocol is a based on Institute of Electrical and Electronics Engineers (IEEE) 802.11 be amendment to IEEE 802.11 technical standard specification, and the first preamble includes a universal signal (U-SIG) field followed by an Extremely High Throughput (EHT) signal (EHT-SIG) field, and where the second communication protocol is based on a next generation of the IEEE 802.11 technical standard specification, and the second preamble includes the U-SIG field followed by a next generation signal (NG-SIG) field.

Clause 49. A method for wireless communication by an apparatus of a wireless station, including: receiving at least a portion of a wireless packet that includes a first preamble in a first subchannel of a wireless channel and a second preamble in a second subchannel of the wireless channel, the first preamble based on a first wireless communication protocol and the second preamble based on a second wireless communication protocol: determining that the wireless station supports the first wireless communication protocol: and processing the first preamble in accordance with the first wireless communication protocol.

Clause 50. The method of clause 49, further including: determining that the wireless station also supports the second wireless communication protocol: and processing the second preamble in accordance with the second wireless communication protocol.

Clause 51. The method of any one of clauses 49-50, where the wireless packet is a multi-generation physical layer convergence protocol (PLCP) protocol data unit (PPDU) formatted as a single PPDU.

Clause 52. The method of any one of clause 49-50, where the wireless packet is a multi-generation physical layer convergence protocol (PLCP) protocol data unit (PPDU) formatted as a compound PPDU in which each subchannel includes signaling and data fields that can be decoded as a separate PPDU.

Clause 53. The method of any one of clauses 49-52, further including: receiving, before the wireless packet, a control message that instructs the wireless station to monitor for and receive the first preamble in the first subchannel, where the wireless station is configured to disregard subchannels other than the first subchannel when receiving the wireless packet.

Clause 54. The method of any one of clauses 49-53, where the wireless packet includes a trigger frame that instructs the first WLAN device to use the first subchannel for a multi-user (MU) uplink (UL) physical layer convergence protocol (PLCP) protocol data unit (PPDU) after receiving the trigger frame, the method further including: transmitting the MU UL PPDU via the first subchannel, where the MU UL PPDU is formatted according to the first wireless communication protocol.

Clause 55. The method of clause 54, where the MU UL PPDU includes a first UL preamble and a first UL data field, where the trigger frame indicates lengths for the first UL preamble and the first UL data field so that the lengths of the first UL preamble and the first UL data field will align with corresponding lengths of a second UL preamble and a second UL data field of a different UL PPDU in the second subchannel, and where the MU UL PPDU and the different UL PPDU are concurrently communicated via the first subchannel and the second subchannel, respectively.

Another innovative aspect of the subject matter described in this disclosure can be implemented in a wireless communication device. In some implementations, the wireless communication device includes at least one interface and at least one processor configured to perform any one of the above referenced methods.

Another innovative aspect of the subject matter described in this disclosure can be implemented in the wireless communication device having at least one memory communicatively coupled with the at least one processor and storing processor-readable code that, when executed by the at least one processor, causes the wireless communication device to implement any one of the above referenced methods.

Another innovative aspect of the subject matter described in this disclosure can be implemented a mobile station including the wireless communication device and one or more transceivers coupled to the wireless communication device to communicate with a WLAN. The mobile station may include one or more antennas coupled to the one or more transceivers to wirelessly transmit signals output from the transceivers and to wirelessly receive signals for input into the transceivers. The mobile station may include a housing that encompasses the wireless communication device, the one or more transceivers and at least a portion of the one or more antennas.

Another innovative aspect of the subject matter described in this disclosure can be implemented in an apparatus having at least one processor and at least one memory communicatively coupled with the at least one processor of a wireless communication device and storing processor-readable code that, when executed by the at least one processor, causes the wireless communication device to implement any one of the above referenced methods.

Another innovative aspect of the subject matter described in this disclosure can be implemented in a tangible computer-readable storage medium including non-transitory processor-executable code which, when executed by at least one processor of a wireless communication device, causes the wireless communication device to implement any one of the above referenced methods.

Another innovative aspect of the subject matter described in this disclosure can be implemented a system having means for implementing any one of the above referenced methods.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general-purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module that may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication by an access point (AP) of a wireless local area network (WLAN), comprising:
    obtaining first data for a first wireless station;
    obtaining second data for a second wireless station; and
    transmitting a wireless packet that includes a physical layer protocol data unit comprising both a first generation-specific preamble formatted according to a first generation of a wireless communication protocol via a first subchannel of a wireless channel and a second generation-specific preamble formatted according to a second generation of the wireless communication protocol via a second subchannel of the wireless channel, the physical layer protocol data unit further comprising the first data and the second data populated in respective portions of one or more data fields after both the first generation-specific preamble and the second generation-specific preamble, the first generation-specific preamble indicating a first resource unit (RU) allocation in the one or more data fields in accordance with the first generation of the wireless communication protocol and the second generation-specific preamble indicating a second RU allocation in the one or more data fields in accordance with the second generation of the wireless communication protocol, the second RU allocation allocating at least one RU within the first subchannel for the second data corresponding to the second generation of the wireless communication protocol.

2. The method of claim 1, further comprising:
    including first generation-specific signaling in the first generation-specific preamble to indicate a first RU of the first RU allocation in the one or more data fields of the physical layer protocol data unit that is allocated to the first wireless station; and
    including second generation-specific signaling in the second generation-specific preamble to indicate a second RU of the second RU allocation in the one or more data fields of the physical layer protocol data unit that is allocated to the second wireless station.

3. The method of claim 2, wherein the first generation-specific signaling indicates a first plurality of RUs of the first RU allocation that is allocated to a first plurality of wireless stations, including the first wireless station, respectively, and wherein the second generation-specific signaling indicates a second plurality of RUs of the second RU allocation that is allocated to a second plurality of wireless stations, including the second wireless station, respectively.

4. The method of claim 3, further comprising:
    limiting the first plurality of RUs signaled in the first generation-specific signaling to a bandwidth of the first subchannel.

5. The method of claim 4,
    wherein the one or more data fields includes a single data field that spans at least the first subchannel and the second subchannel.

6. The method of claim 1, wherein the wireless packet is formatted as a compound physical layer protocol data unit, the method further comprising:
    transmitting a first portion of the compound physical layer protocol data unit formatted according to the first generation via at least a portion of the first subchannel and a second portion of the compound physical layer protocol data unit formatted according to the second generation via at least a portion of the second subchannel, concurrently, to form the compound physical layer protocol data unit.

7. The method of claim 6, wherein the first portion of the compound physical layer protocol data unit includes the first generation-specific preamble followed by a first data field in the one or more data fields via at least the portion of the first subchannel, and the second portion of the compound physical layer protocol data unit includes the second generation-specific preamble followed by a second data field in the one or more data fields via at least the portion of the second subchannel.

8. The method of claim 7, wherein the first generation-specific preamble of the first portion of the compound physical layer protocol data unit includes first signaling for RUs in the first data field based on a first bandwidth of the first subchannel, and wherein the second generation-specific preamble of the second portion of the compound physical layer protocol data unit includes second signaling for RUs in the second data field based on a second bandwidth of the second subchannel.

9. The method of claim 7, further comprising:
    padding a shorter one of the first data field or the second data field to make respective lengths of the first data field and the second data field the same such that the first portion of the compound physical layer protocol data unit and the second portion of the compound physical layer protocol data unit end concurrently.

10. The method of claim 1, further comprising:
    padding a shorter one of the first generation-specific preamble or the second generation-specific preamble to make respective lengths of the first generation-specific preamble and the second generation-specific preamble the same such that the first generation-specific preamble and the second generation-specific preamble end concurrently.

11. The method of claim 1, wherein the first generation-specific preamble and the second generation-specific preamble are output using orthogonal frequency division multiplexing (OFDM) symbols that span the first subchannel and the second subchannel.

12. The method of claim 1, wherein a first bandwidth size of the first subchannel is different from a second bandwidth size of the second subchannel, and wherein each of the first subchannel and the second subchannel have a bandwidth size that is a multiple of 80 MHz bandwidth.

13. The method of claim 1, further comprising, before transmitting the wireless packet:
    transmitting a control message informing the first wireless station to decode the first generation-specific preamble via the first subchannel according to the first generation such that the first wireless station disregards the second generation-specific preamble via the second subchannel.

14. The method of claim 1, wherein the first generation of the wireless communication protocol is a based on Institute of Electrical and Electronics Engineers (IEEE) 802.11be amendment to IEEE 802.11 technical standard specification, and the first generation-specific preamble includes a universal signal (U-SIG) field followed by an Extremely High Throughput (EHT) signal (EHT-SIG) field, and wherein the second generation of the wireless communication protocol is based on a different amendment to the IEEE 802.11 technical standard specification.

15. The method of claim 1, further comprising:
transmitting a trigger frame to at least the first wireless station and the second wireless station, the trigger frame informing the first wireless station to transmit a first uplink physical layer protocol data unit via at least a portion of the first subchannel and further informing the second wireless station to transmit a second uplink physical layer protocol data unit via at least a portion of the second subchannel; and
receiving the first uplink physical layer protocol data unit from the first wireless station via at least the portion of the first subchannel and the second uplink physical layer protocol data unit from the second wireless station via at least the portion of the second subchannel, concurrently, wherein the first uplink physical layer protocol data unit is formatted according to the first generation and the second uplink physical layer protocol data unit is formatted according to the second generation.

16. The method of claim 15, wherein the trigger frame indicates lengths for a first uplink preamble and a first uplink data field of the first uplink physical layer protocol data unit such that the lengths of the first uplink preamble and the first uplink data field of the first uplink physical layer protocol data unit received via at least the portion of the first subchannel align with corresponding lengths of a second uplink preamble and a second uplink data field of the second uplink physical layer protocol data unit received via at least the portion of the second subchannel.

17. A method for wireless communication by an apparatus of a wireless station, comprising:
receiving at least a portion of a wireless packet that includes a physical layer protocol data unit comprising a first generation-specific preamble formatted according to a first generation of a wireless communication protocol via a first subchannel of a wireless channel, wherein the physical layer protocol data unit further comprises a second generation-specific preamble formatted according to a second generation of the wireless communication protocol via a second subchannel of the wireless channel, the first generation-specific preamble indicating a first resource unit (RU) allocation in one or more data fields of the physical layer protocol data unit in accordance with the first generation of the wireless communication protocol and the second generation-specific preamble indicating a second RU allocation in the one or more data fields of the physical layer protocol data unit in accordance with the second generation of the wireless communication protocol, the second RU allocation allocating at least one RU within the first subchannel for data corresponding to the second generation of the wireless communication protocol; and
processing the first generation-specific preamble in accordance with the first generation.

18. The method of claim 17, further comprising:
disregarding the second generation-specific preamble via the second subchannel.

19. The method of claim 17, wherein the wireless packet is formatted as a compound multi-generation physical layer protocol data unit that includes a first portion of the compound multi-generation physical layer protocol data unit via at least a portion of the first subchannel formatted according to the first generation and a second portion of the compound multi-generation physical layer protocol data unit via at least a portion of the second subchannel formatted according to the second generation.

20. The method of claim 17, further comprising:
receiving, before the wireless packet, a control message that instructs the wireless station to monitor for and receive the first generation-specific preamble via at least a portion of the first subchannel, wherein the wireless station is configured to disregard subchannels other than the first subchannel when receiving the wireless packet.

21. The method of claim 17, further comprising:
receiving a trigger frame that informs the wireless station to transmit a first uplink physical layer protocol data unit via at least a portion of the first subchannel; and
transmitting the first uplink physical layer protocol data unit via at least the portion of the first subchannel, wherein the first uplink physical layer protocol data unit is formatted according to the first generation.

22. The method of claim 21, wherein the trigger frame indicates lengths for a first uplink preamble and a first uplink data field of the first uplink physical layer protocol data unit such that the lengths of the first uplink preamble and the first uplink data field align with corresponding lengths of a second uplink preamble and a second uplink data field of a second uplink physical layer protocol data unit from a different wireless station via the second subchannel.

23. An access point comprising:
at least one processor configured to:
obtain first data for a first wireless station, and
obtain second data for a second wireless station; and
at least one modem communicatively coupled with the at least one processor and configured to output a wireless packet that includes a physical layer protocol data unit comprising both a first generation-specific preamble formatted according to a first generation of a wireless communication protocol via a first subchannel of a wireless channel and a second generation-specific preamble formatted according to a second generation of the wireless communication protocol via a second subchannel of the wireless channel, the physical layer protocol data unit further comprising the first data and the second data populated in respective portions of one or more data fields after both the first generation-specific preamble and the second generation-specific preamble, the first generation-specific preamble indicating a first resource unit (RU) allocation in the one or more data fields in accordance with the first generation of the wireless communication protocol and the second generation-specific preamble indicating a second RU allocation in the one or more data fields in accordance with the second generation of the wireless communication protocol, the second RU allocation allocating at least one RU within the first subchannel for the second data corresponding to the second generation of the wireless communication protocol.

24. The access point of claim 23, wherein the at least one processor is further configured to:
include first generation-specific signaling in the first generation-specific preamble to indicate a first RU of the first RU allocation in the one or more data fields of the physical layer protocol data unit that is allocated to the first wireless station; and
include second generation-specific signaling in the second generation-specific preamble to indicate a second RU of the second RU allocation in the one or more data fields of the physical layer protocol data unit that is allocated to the second wireless station.

25. The access point of claim 23, wherein the wireless packet is formatted as a compound physical layer protocol data unit, and wherein the at least one modem is configured to output a first portion of the compound physical layer protocol data unit formatted according to the first generation via at least a portion of the first subchannel and a second portion of the compound physical layer protocol data unit formatted according to the second generation via at least a portion of the second subchannel, concurrently, to form the compound physical layer protocol data unit.

26. The access point of claim 25, wherein the first portion of the compound physical layer protocol data unit includes the first generation-specific preamble followed by a first data field in the one or more data fields via at least the portion of the first subchannel, and the second portion of the compound physical layer protocol data unit includes the second generation-specific preamble followed by a second data field in the one or more data fields via at least the portion of the second subchannel.

27. The access point of claim 23, further comprising:
at least one memory communicatively coupled with the at least one processor and storing processor-readable code;
at least one transceiver coupled to the at least one modem;
at least one antenna coupled to the at least one transceiver to wirelessly transmit first signals output from the at least one transceiver and to wirelessly receive second signals for input into the at least one transceiver; and
a housing that encompasses the at least one modem, the at least one processor, the at least one memory, the at least one transceiver and at least a portion of the at least one antenna.

28. A wireless station comprising:
at least one modem configured to obtain at least a portion of a wireless packet that includes a physical layer protocol data unit comprising a first generation-specific preamble formatted according to a first generation of a wireless communication protocol via a first subchannel of a wireless channel, wherein the physical layer protocol data unit further comprises a second generation-specific preamble formatted according to a second generation of the wireless communication protocol via a second subchannel of the wireless channel, the first generation-specific preamble indicating a first resource unit (RU) allocation in one or more data fields of the physical layer protocol data unit in accordance with the first generation of the wireless communication protocol and the second generation-specific preamble indicating a second RU allocation in the one or more data fields of the physical layer protocol data unit in accordance with the second generation of the wireless communication protocol, the second RU allocation allocating at least one RU within the first subchannel for data corresponding to the second generation of the wireless communication protocol; and
at least one processor communicatively coupled with the at least one modem and configured to process the first generation-specific preamble in accordance with the first generation.

29. The wireless station of claim 28, further comprising:
the at least one modem configured to obtain, before the wireless packet, a control message; and
the at least one processor configured to:
process the control message,
cause the at least one modem to monitor for and receive the first generation-specific preamble via at least a portion of the first subchannel based on an instruction in the control message, and
cause the at least one modem to disregard subchannels other than the first subchannel.

30. The wireless station of claim 28, further comprising:
at least one memory communicatively coupled with the at least one processor and storing processor-readable code;
at least one transceiver coupled to the at least one modem;
at least one antenna coupled to the at least one transceiver to wirelessly transmit first signals output from the at least one transceiver and to wirelessly receive second signals for input into the at least one transceiver; and
a housing that encompasses the at least one modem, the at least one processor, the at least one memory, the at least one transceiver and at least a portion of the at least one antenna.

* * * * *